(12) United States Patent
Bishop

(10) Patent No.: US 7,887,254 B2
(45) Date of Patent: *Feb. 15, 2011

(54) WAVE ATTENUATOR AND SECURITY BARRIER SYSTEM-ADJUSTOR

(75) Inventor: Justin Bishop, West Caldwell, NJ (US)

(73) Assignee: Halo Maritime Defense Systems, Inc., Andover, MA (US)

( * ) Notice: Subject to any disclaimer, the term of this patent is extended or adjusted under 35 U.S.C. 154(b) by 1737 days.

This patent is subject to a terminal disclaimer.

(21) Appl. No.: 11/013,043

(22) Filed: Dec. 13, 2004

(65) Prior Publication Data

US 2009/0022548 A1    Jan. 22, 2009

Related U.S. Application Data

(60) Provisional application No. 60/528,933, filed on Dec. 11, 2003, provisional application No. 60/528,935, filed on Dec. 11, 2003, provisional application No. 60/528,936, filed on Dec. 11, 2003.

(51) Int. Cl.
*E02B 3/06*    (2006.01)
(52) U.S. Cl. .......................................... 405/26; 405/21
(58) Field of Classification Search ................... 405/21, 405/23, 25–28, 30–31, 33–35; 114/240 R, 114/240 A, 240 B, 240 D
See application file for complete search history.

(56) References Cited

U.S. PATENT DOCUMENTS

| 4,498,805 | A | * | 2/1985 | Weir | 405/31 |
|---|---|---|---|---|---|
| 4,776,725 | A | * | 10/1988 | Brade | 405/31 |
| 5,120,156 | A | * | 6/1992 | Rauch | 405/25 |
| 5,246,307 | A | * | 9/1993 | Rauch | 405/25 |
| 7,029,200 | B1 | * | 4/2006 | Cravens | 405/30 |
| 7,165,912 | B2 | * | 1/2007 | Herzog | 405/25 |
| 7,524,140 | B2 | * | 4/2009 | Bishop | 405/30 |

FOREIGN PATENT DOCUMENTS

| JP | 62025607 | A | * | 2/1987 |
|---|---|---|---|---|
| JP | 03132505 | A | * | 6/1991 |

* cited by examiner

*Primary Examiner*—Sunil Singh
(74) *Attorney, Agent, or Firm*—McDermott Will & Emery LLP

(57) ABSTRACT

A module for a wave attenuation system formed by connecting a plurality of panels in a structure positioned in a body of water, causes the dissipation of wave energy. Different configurations of panel, having different flow characteristics, used in the structure, and different types of connector used to connect panels, create different patterns of water flow within the structure, and contribute to wave energy dissipation. Units deployed in harbors, rivers, marinas and the like, help to prevent beach erosion and can facilitate beach nourishment. Embodiments can be utilized as a security barrier, preventing intrusion by trespassers, divers or various sized boats. A variety of sensors can be mounted to the structures, enabling detection of movement, chemical and biological agents, explosives or radiation. A submersible gate, comprising panels and a buoyancy control mechanism, allows for passage of boats and can be controlled remotely.

12 Claims, 23 Drawing Sheets

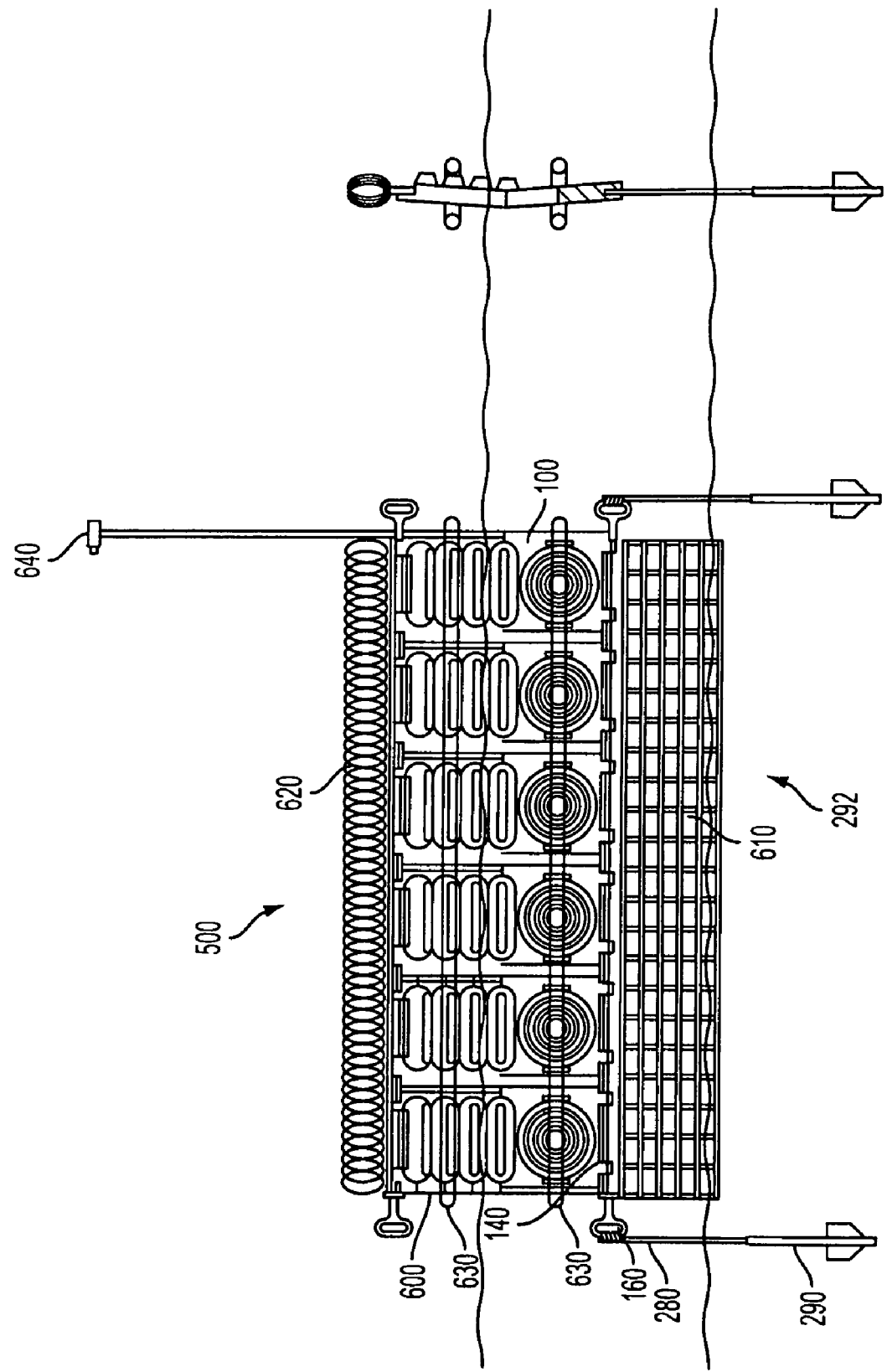

WAVE ATTENUATOR AND SECURITY BARRIER SYSTEM-ADJUSTOR

CROSS REFERENCES TO RELATED APPLICATIONS.

This application claims the benefit of U.S. Provisional Patent Application Ser. Nos. 60/528,933, filed 11 Dec. 2003; 60/528,935, filed 11 Dec. 2003; and 60/528,936 filed 11 Dec. 2003, the contents of which are incorporated by reference herein.

FIELD OF THE INVENTION

Embodiments of the present invention relate to an apparatus, system and method to dissipate the energy of a wave or other like motion of water, and, in particular, to an apparatus and system that can be readily assembled on site and which provides for protection from the potentially damaging energy of the waves. Certain embodiments are designed to be used in locations such as a harbor, marina or inland waterway where there is a low wave energy environment. Additional embodiments function as security barriers to protect an area against intrusion by divers, trespassers, or various sized boats.

BACKGROUND OF THE INVENTION

The destructive force of water can be damaging to structures, cause erosion of land and also damage to boats or other craft that are caused to move by the force of the water motion as it hits other boats or structures. The problem, therefore, is not limited to shore areas where the erosive effect is potentially damaging to the shore area but can be present in marinas, boat moorage areas or to any structure that abuts or is located in the near proximity to the water.

Numerous types of apparatus have been proposed and used for the protection of a shoreline against the continual erosion occasioned by the action of waves that strike the share. Some devices have relied upon permanent structures that are installed on or near the shoreline and which are made of concrete, steel or other heavy, stable materials. Examples of such permanent structures are shown and described in U.S. Pat. Nos. 4,711,598; 4,367,978 and 905,596, where the structures are constructed to be permanent as well as entrenched and affixed to the land.

While often effective, such permanent structures suffer from a lack of versatility; that is, once constructed, they are permanent structures that cannot be easily moved to other locations where such protection is needed. There are also certain locations where permanent structures are simply not appropriate, such as within marinas, harbors or boat channels. In such areas, some means to alleviate the potential harm caused by the uncontrolled movement of the water against boats or docks is needed to counter the force of the wakes left by boats and the normal motion of water.

Other means have also been proposed that are floating structures, including the use of hollow cylinders as shown in U.S. Pat. No. 5,827,011 or using a plurality of vehicle tires that form a carpet on the water (U.S. Pat. No. 4,824,286), U.S. Pat. No. 5,871,303 discloses an array of panel materials, anchored to the river or sea bed, that are used to precipitate particles out of their suspension in the water. Various barriers of a mesh material or use of ballasting blocks are disclosed in U.S. Pat. Nos. 5,795,099 and 4,279,536.

One energy dissipation system has been disclosed in U.S. Pat. No. 5,879,105 by the present inventor, comprising a plurality of buoyant modules affixed together such that these specially designed modules, working together, can disrupt the wave action in order to dissipate the energy of the wave motion. The modules are designed to deflect the water motion around the modules to effectively dissipate the wave energy; such apparatus has been proven to be very effective in affording protection against the destructive motion of the water.

BRIEF SUMMARY OF THE INVENTION

The purpose of the present invention is to provide an apparatus and system that carries out effective dissipation of the energy of the wave or water motion and which system can be easily constructed in the ocean to alleviate the destructive nature of waves but can also, just as readily, be constructed and installed in a marina, harbor or other location where the movement of the water can be caused by the wake of a boat or normal water movement, including storms that may cause the water to rise to a destructive energy.

With embodiments of the present invention, individual modules are provided that are easy and relatively inexpensive to produce and can be made of a plastic material such as polyethylene and molded into the particular desired configuration. A multiplicity of such modules are affixed together in a particular manner and configuration to form the breakwater system.

Such system comprises affixing the individual modules together in an aligned vertically disposed panel by means of elastic members such as rubber tubes, thus each vertical panel of modules has a certain flexibility and can flex during its dissipation of the wave or water surge energy. The vertical panels of modules are formed in multiples of such vertically disposed panels and the vertical panels are further joined together to additional similarly constructed vertical panels to create the overall breakwater system. Since the vertical panels are also joined together by elastic members, such as rubber tubes, the overall breakwater system can flex both in the vertical as well as horizontal directions, thus providing considerable overall give to the system when a wave or water surge is encountered.

In embodiments of the present invention, unlike that of prior art U.S. Pat. No. 5,879,105, the modules are specially constructed to allow the water to pass both through the individual modules, as well as around such modules, and that action, enhances the ability of the present system to effectively dissipate the energy of the wave. In particular, with the present modules, each module has at least three passageways.

One embodiment is harbor wave attenuator, a version to operate in a harbor, marina, and inland waterway low wave energy environment. This embodiment uses pilings as an anchor method. A connector mechanism, referred to as a "pile rider", allows embodiments of the present invention to ride up and down along a piling on the tide and extreme wave conditions. In this manner, energy, instead of being transferred into the soil through mooring lines, actually travels through connector struts or a rope belting, to the pile rider, and then into a piling which is embedded in the seabed.

Embodiments of the present invention can be used in one of several different deployment options. The panels are portable, and quickly adaptable for any planned harbor expansion. Panels can be used as a dock or finger dock, and so can blend into the existing configuration of a marina. Embodiments can be customized to a harbor, marina or other area. Different sized panels allow embodiments of the present invention to quickly and easily adapt to a deployment location. The different sized panels operate in a different manner; the apertures are different on the smaller panels and are designed to create straight jets of water with increased velocity where other, larger sized panels are designed to send jets of energy at angles. By alternating flows of energy at different levels in the water column tremendous turbulence is created in a small area, and thus provides significant performance advantages over conventional technologies with regards to the area covered and the mass of structure required to dissipate waves.

Some functions of embodiments of the present invention are as follows:

- Units are portable and can be moved using small workboats and divers;
- Use as a silt barrier to prevent build up of sediment in harbors by closing the apertures in a panel;
- Does not block light from reaching grasses in sensitive environmental applications, because large pools of light are created within the structure;.
- The multiple panel sized structure is adjustable for any depth of water or slope;
- Multiple panel sizes enable the structure to be "tuned" to particular conditions, that is, to match the configuration of the location, the seabed contour, and to fit in tight spaces, such as under piers in a marina;
- Units can be attached to a piling using another embodiment of the present invention, which prevents damage to the piling;
- Mass & buoyancy of panels is adjustable in the water;
- Physical makeup of a structure can be adjusted in the water;
- Panels can be replaced to provide better performance or upgrades to system;
- Aqua-jet effect hydrostatic pressure cleans out apertures with wave action, debris and flotsam does not accumulate within the apertures of the structure;
- Bulls-eye design adds strength to panel and creates additional turbulence; the concentric rings placed upon the surface of panel serve to break up laminar flow over the surface of panel;
- Different sized panels operating in different manners combine effort to help confuse the wave of energy;
- Plugging the apertures of the structure will improve (selectively change) performance;
- Using panels in a staggered deployment will allow passage of vessels;
- Panels can be coated with a polyurethane coating to provide additional strength and abrasion resistance when units are butted up against steel or concrete in the marine environment;
- Docks or life guard stations, or other structures, can be built upon units;
- Modifications can be made to existing units to convert wave energy into usable electrical current;
- Systems can be deployed with an abundance of rows to deposit sand on a beach, and help prevent beach erosion;
- When used in a sunken configuration, the sunken configuration simulates an underwater reef, trapping sand and becoming a sand bar;
- Vertical & Horizontal energy transfer;
- Hinges allow structure to bellow, rows move back and forth with wave energy, which expends additional destructive wave energy;
- Flow through assembly instead of deflecting wave energy;
- Slots in panels cause a bifurcation of the flow of energy;
- Ridges on lugs serve to break up laminar flow, channels are created between panel's angled facets on sides of panels;
- Waves travel through structure in a sinusoidal line horizontally and vertically;
- 45-degree angles top and bottom force wave to spill over structure lose energy;
- Ridges on inside of cones serve to break up laminar flow;
- Holes around bulls eye serve as mounting points for instrument packages they also relieve pressure upon face of panel creating additional flows through structure;
- Slots on panel can act as mooring points, assembly points and forklift points;
- Rods allow structure to flex offering just enough stiffness to resist waves yet flexible enough to not break under extreme loads.
- Support members transfer load evenly across system.

Several embodiments of boat barriers can be formed using multiple panels. In these embodiments, the panels are turned 90 degrees into a vertical orientation and either a steel cable chain or rope or belting is passed through lugs on the panels to form a row of panels, which is buoyant and sufficiently strong enough to support boat capture and deflection methods. These panels allow multiple detection systems to be deployed in conjunction with a barrier, such as sonar, motion sensors or surveillance cameras. Because of the cable's elasticity, the barrier embodiments will collapse and wrap around a vessel, holding it in place while security forces can respond. The different boat barrier embodiments are designed to provide different levels of protection, from a portable unit to a permanent structure. The use of several rows of panels can form a layered defense barrier, instead of a single wall, and redundancy is built into the barrier with the multiple rows of panels that are employed.

Embodiments of the present invention include a wave attenuation system formed by connecting a plurality of panels in a structure positioned in a body of water, causes the dissipation of wave energy. Different configurations of panel, having different flow characteristics, used in the structure, and different types of connector used to connect panels, create different patterns of water flow within the structure, and contribute to wave energy dissipation. Units deployed in harbors, rivers, marinas and the like, help to prevent beach erosion and can facilitate beach nourishment. Embodiments can be utilized as a security barrier, preventing intrusion by trespassers, divers or various sized boats. A variety of sensors can be mounted to the structures, enabling detection of movement, chemical and biological agents, explosives or radiation. A submersible gate, comprising panels and a buoyancy control mechanism, allows for passage of boats and can be controlled remotely.

BRIEF DESCRIPTION OF THE SEVERAL VIEWS OF THE DRAWING

FIG. 12 illustrates a small boat barrier embodiment.

FIG. 15 illustrates a security gate embodiment.

DETAILED DESCRIPTION OF THE INVENTION

For purposes of the present specification, the term "seabed" will be used to refer to any ground, soil, mud, rock, gravel, clay, and the like, that is beneath the body of water in which embodiments of the present invention are being deployed, and is not intended to be limited to the floor of an ocean or sea environment. Thus, seabed can include an actual seabed in an ocean or harbor environment, the bottom of a lake, river, stream or the like.

The term "ERW pipe" refers to Electric Resistance Welded pipe.

The terms "aperture" and "passageway", when used in reference to an opening in the panel, will be used interchangeably.

Embodiments of the present invention are designed to prevent beach erosion and damage to coastlines. By working with the power of the ocean, and by allowing a portion of wave energy to pass through the structure, a wave's energy is expended slowly through the structure, reducing anchor loads and stresses upon the structure. Embodiments of the invention are adjustable to the conditions of a particular location, including depth of water and wave parameters. In so "tuning" the structure to the location, additional rows of panels may be utilized to increase the system's performance by matching it to a wave's period. Embodiments of the present invention cause a wave to be a spilling breaker instead of the more destructive plunging breaker commonly found along shorelines, which in turn allows for more control of shoreline stabilization efforts.

The use of embodiments of the present invention can be done in conjunction with beach nourishment programs, allowing nourished beaches to remain in place for a longer period of time, saving dollars and allowing wave energy to be further expended upon a fully formed beach. It may even eliminate the need for nourishments, bringing equilibrium to a shoreline.

Embodiments for Deployment in an Ocean or Harbor

Figure 1A:
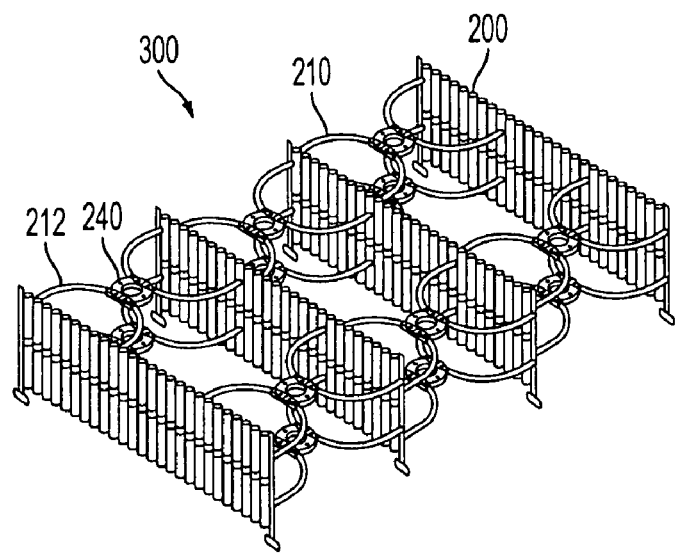
FIG. 1A is a schematic illustration of an ocean unit embodiment.
Figure 1B:
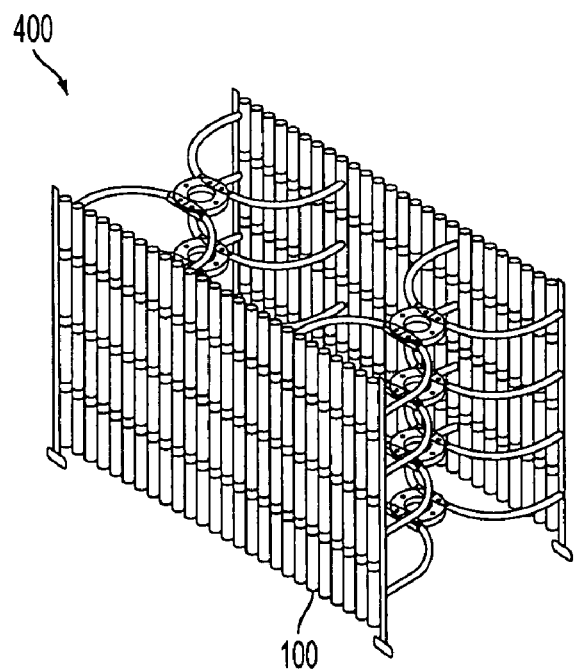
FIG. 1B is a schematic illustration of a harbor unit embodiment.
Figure 2A:
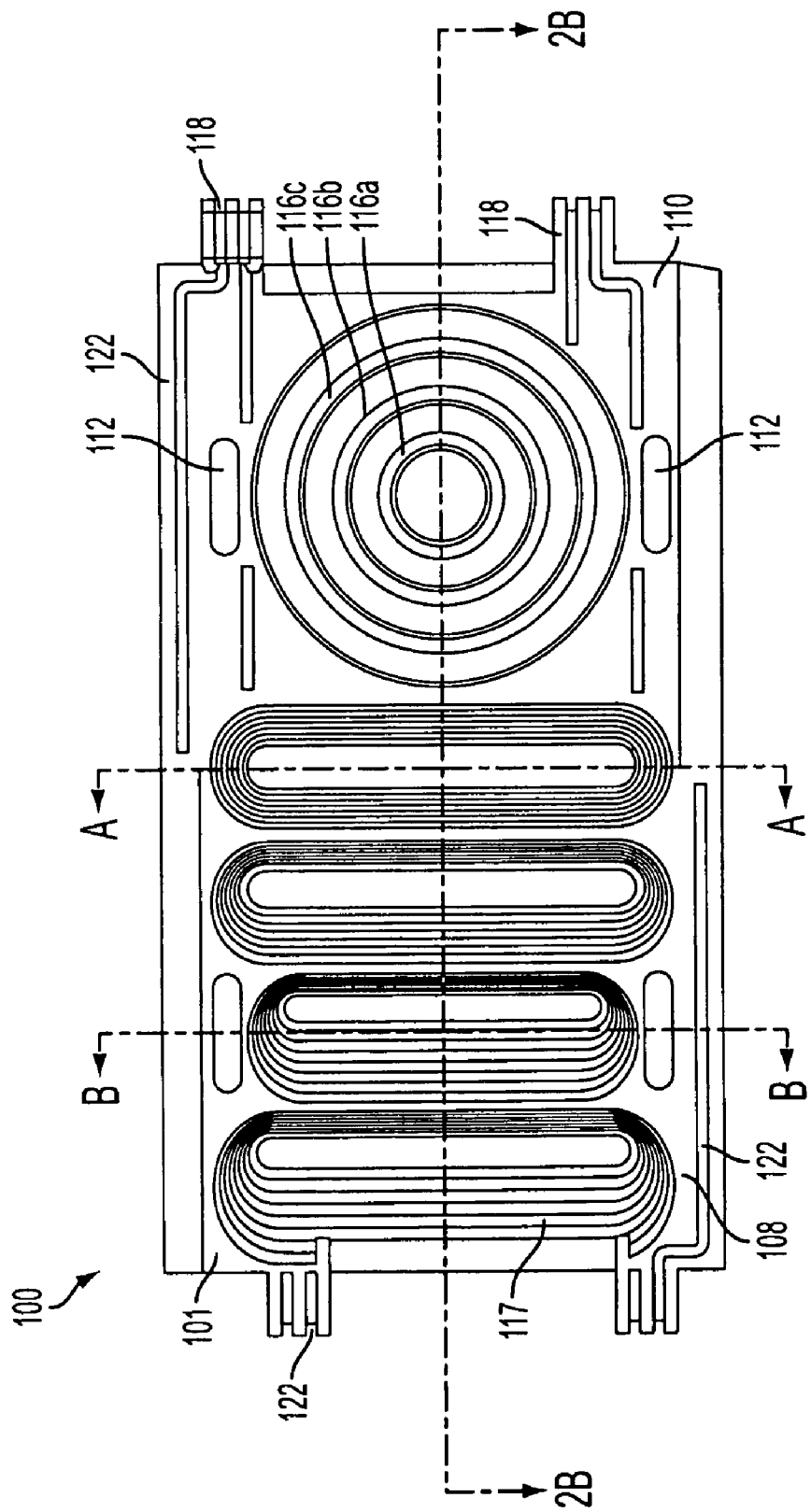
FIG. 2A is a plan view of a panel embodiment.

Using a panel embodiment 100 (FIG. 2A), larger units can be built up for deployment in various environments, such as, and for example only, in a marine environment such as the ocean (FIG. 1A), or within a harbor (FIG. 1B). A number of panels 100 can be joined side by side to form a row 200. The panels 100 or rows 200 can also be joined top to bottom to form a unit with an increased depth.

An embodiment 300 for deployment in an ocean is shown in FIG. 1A, and a harbor embodiment 400 is shown in FIG. 1B. The ocean embodiment shown includes 4 rows 200, with each row including 6 panels 100. The exemplary harbor unit 400 comprises 6 rows 200, with each row comprising 4 panels 100. The rows 200 are joined by means of a hoop connector 210 and hub 240.

A panel 100 (FIGS. 2A-B) comprises a front 101, back 102, top 103, bottom 104 and sides 108 and 110. Panel 100, which when formed is generally hollow, but as will be described later, can be coated on the inside with a water resistant foam, and may also contain varying amounts of water, or other material such as ballast, depending upon the ultimate use of a particular panel.

Each panel 100 contains a plurality of slots 112 therethrough, with a pair of slots 112 on each side of the panel. The slots are positioned such the prongs of a lift truck, such as those from a fork lift, can pass therethrough, for movement of the panels. The slots 112 also act as mooring, assembly and gripping points.

The sides 108 and 110 are offset with respect to one another (FIG. 1B), with side 108 comprising a plurality of slotted apertures (or passageways) 114a, 114b, 114c, and 114d therethrough. Each aperture (passageway) 114 is bounded by an inner wall 115, and one or more ridges 117 are present, extending from the inner wall 115 into the aperture 114. The apertures 114a-114d are tapered, and each aperture has a large opening 124 and a small opening 126, the larger opening 124 being positioned to face an oncoming wave.

Side 110 comprises a plurality of circular grooves 116a, 162b, and 116c, on front surface 101. Each side terminates in a pair of lugs 118, which include an opening 120 through which wire, cable, pipe or other attachment means can either pass through, be hooked onto, into or otherwise joined to. As shown in the drawings, the lugs 118 on side 108 are offset with respect to the lugs 118 on side 110, such that when a pair of panels is put together in a side by side arrangement, the lugs 118 of a first panel will align with the lugs 118 of a second panel, enabling the two panels 100 to be connected by a cable, wire, or other means (to be described later) used to connect the panels. Ridges 122 are positioned on the outer surface of lugs 118, and the ridges 122 also contribute to the dissipation of wave energy. The ridges 122 extend onto the front surface 102 of each panel, and may extend either in a continuous or discontinuous manner.

The grooves 116 create additional turbulence when a wave strikes the panel 100. This inventor has determined that the use of concentric grooves upon the front surface 101 of panel 100 breaks up the laminar flow over the surface of the panel and contributes to the dissipation of wave energy. Because this panel 100 is formed with one side that is essentially open, and one side that is closed, it is considered as being 50% open.

The panel 100 of the present invention includes not only slotted apertures of different sizes (compare aperture 114a with 114b) but also employs a plurality of grooves 116 as well.

Figure 2B:
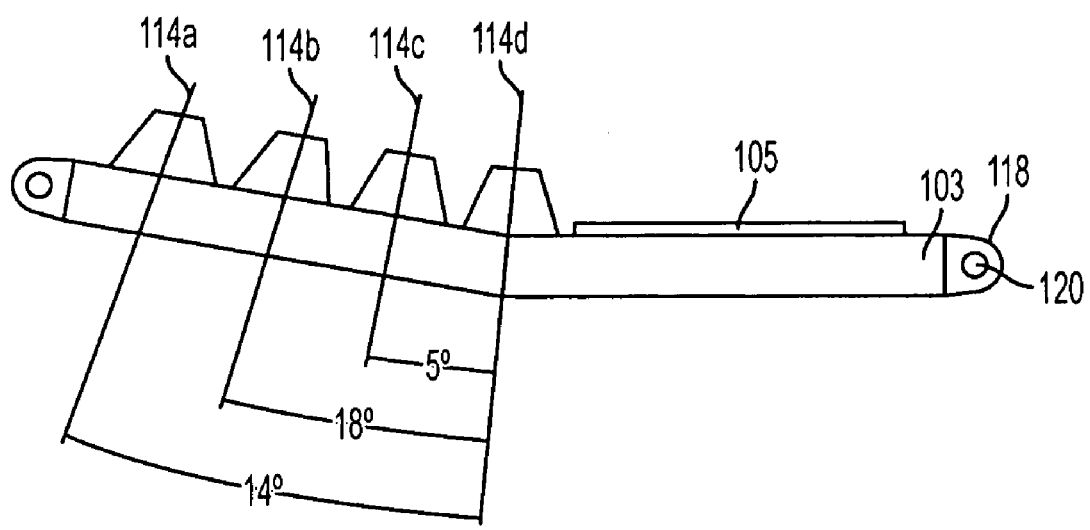
FIG. 2B is a cross-sectional view taken along line 2B-2B of FIG. 2A.

Referring to FIG. 2B, the apertures 114 are angled with respect to the side 106 and with respect to each other. Using a series of center lines drawn through each aperture, if one measures the angle between the center lines of a pair of apertures 114, then the angle between aperture pairs is shown in Table 1.

TABLE 1

| Angle between apertures in panel | |
| --- | --- |
| 114a-114d | 14 degrees |
| 114b-114d | 10 degrees |
| 114c-114d | 5 degrees |

Each aperture 114 includes an aperture wall 115 and extending from aperture wall 115 into the aperture may be one or more ridges 117. In a manner similar to the ridges 122 on the lugs and front side 102 of the panel, ridges 117 contribute to the dissipation of wave energy.

The flow of water through any of the apertures 114 can also be modified by insertion of one of several different sized rubber plugs (not shown) into an aperture (passageway). The plugs range in size from one that completely prevent water from flowing into an aperture, to fractional sizes that provide different degrees of water flow. When all of the apertures 114 are plugged, embodiments of the present invention can function as a silt barrier, and lead to the formation of a sand bar.

When water flow through the apertures 114 is unimpeded by a plug, the water flow and the turbulence created is sufficient to prevent the build up of flotsam and other debris within the apertures.

Depending upon the ultimate use of a particular group of panels 100 they may be joined by tubing 140 which passes through lug openings 120 and through which tubing 140 a cable 150 has been passed, or by means of pipe 152, either in combination with, or in lieu of, the tubing/cable combination. A shackle 160 may be attached to one or more lugs, and the shackle connected to a mooring line for anchoring the panel 100 at a particular location.

Figure 4:
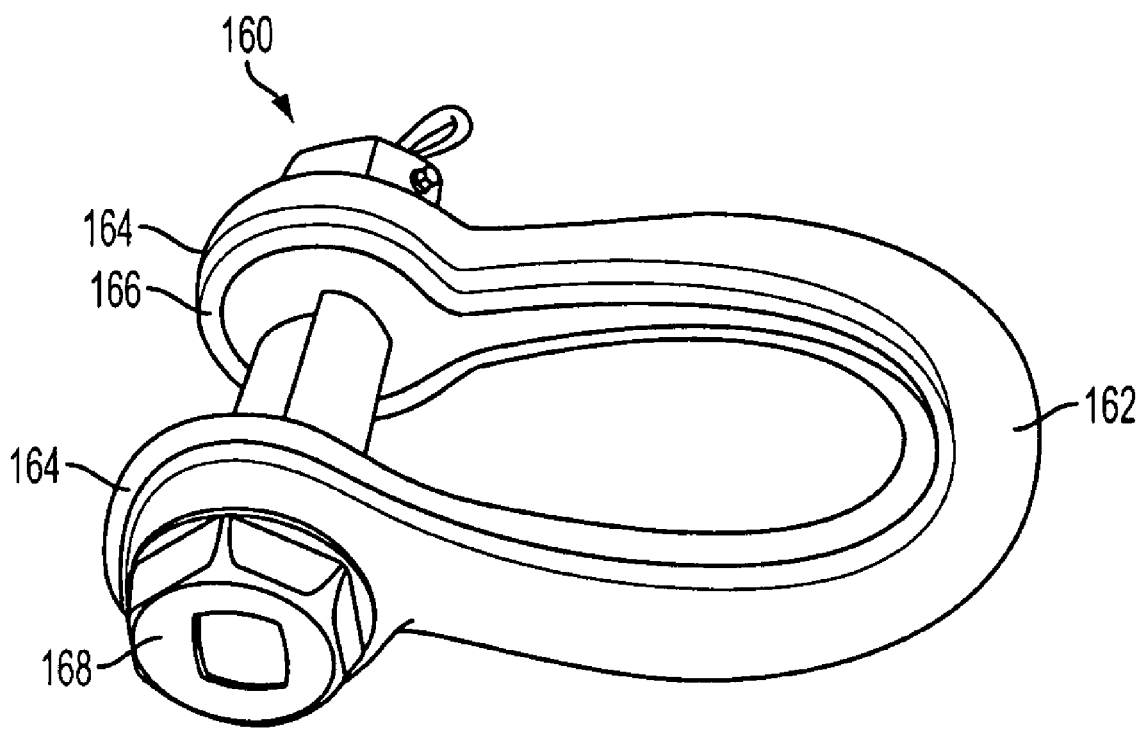
FIG. 4 illustrates a representative shackle.

A representative shackle 160 (FIG. 4) comprises an arcuate body 162 including a pair of ends 164, each end having an opening 166 therethrough, the opening for receiving a fastener 168. In embodiments of the present invention, the ends 164 are positioned near lugs 118 such that fastener 168 will pass through lug openings 120 and secure the shackle 160 to a panel 100. The shackles employed in conjunction with embodiments of the present invention are manufactured from either galvanized, hot dipped galvanized, or stainless steel, usually are manufactured of 1 ¾ inch wire size chain, and are characterized by a break load of about 100,000 pounds.

For example only, and not intended to be a limitation, a panel 100 can be manufactured having dimensions of 4 feet high by 8 feet in length, with a depth of 1 foot. These panels can be manufactured from a plastic, and it is preferred that the plastic have a specific gravity that is less than 1, enabling the panel to float. Linear low density polyethylene or high density polyethylene ("HDPE") are among the materials that can be used. Plastics obtained from the ExxonMobil Corp. have been used and shown to be marine-grade.

A layer of polyurethane foam (not shown) can be blown into each panel 100 during its manufacturing process in order to increase the buoyancy of the panel. One embodiment employs a two component polyurethane foam supplied by Dow Chemical Corp. (Midland, Mich.) that is sold under the trademark of FROTH-PAK®, and which, once formed, is reported to have characteristics of low water absorption, about a 97% closed cell content, is petroleum-resistant, and approved for use for the United States Coast Guard. The foam also serves to increase the strength of the panels in which it is employed. It is anticipated that products from other manufacturers that have equivalent or comparable properties could be utilized. The quantity of foam applied to any series of panels will vary with the specific demands of the end user.

A number of panels 100 can be joined side by side to form a row 200. The panels 100 can also be joined top to bottom to form a unit with an increased depth, such as, for example only, an ocean embodiment 300 or harbor embodiment 400 (FIGS. 1A-1B).

Figure 3A:
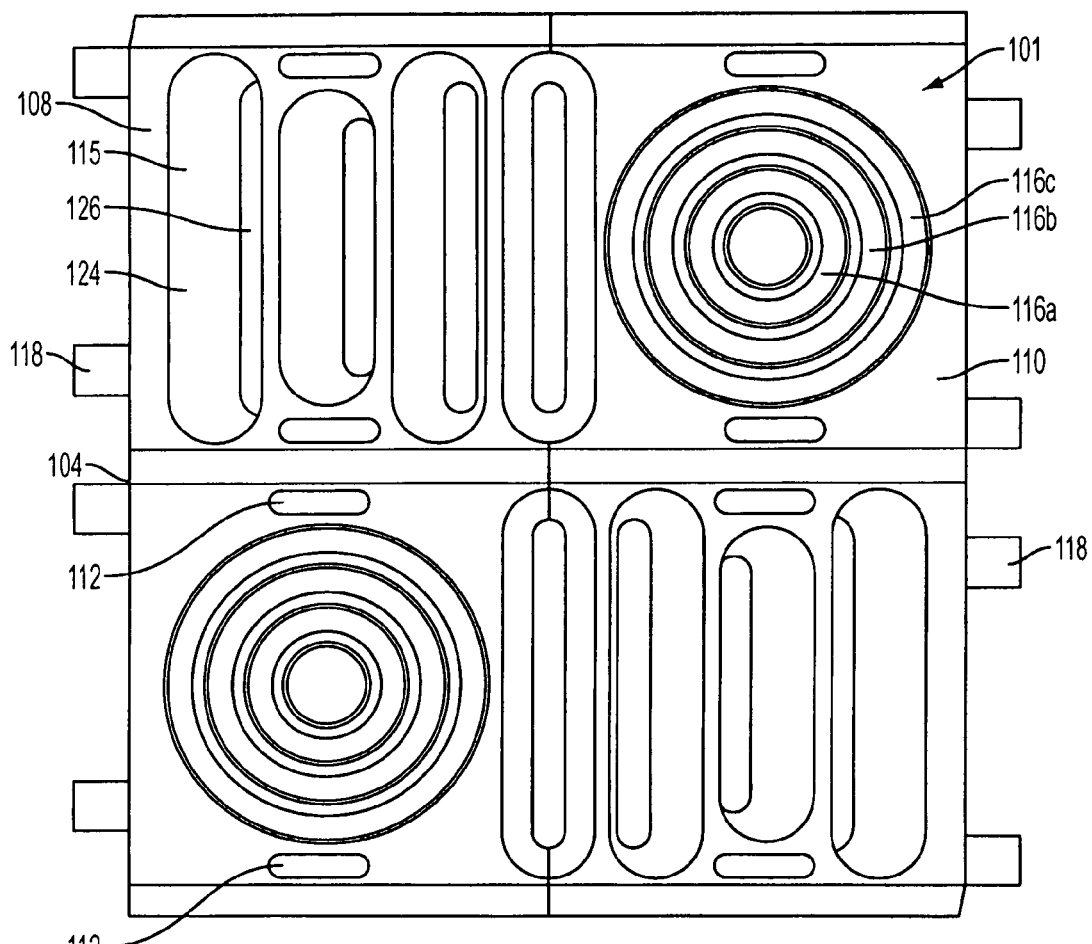
FIG. 3A is a frontal view of a pair of panels joined top to bottom.
Figure 3B:
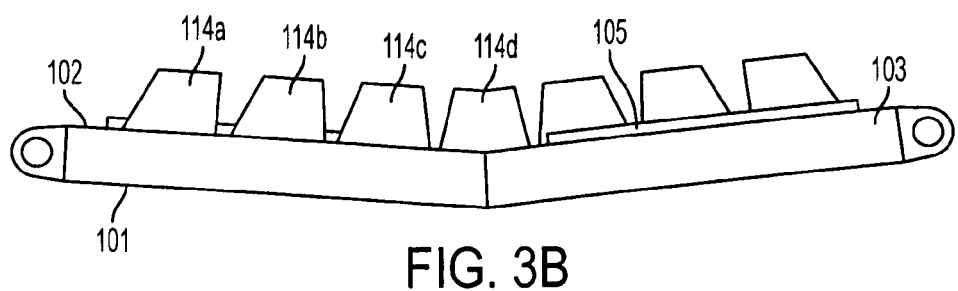
FIG. 3B is a top view of the embodiment of FIG. 3A.
Figure 3C:
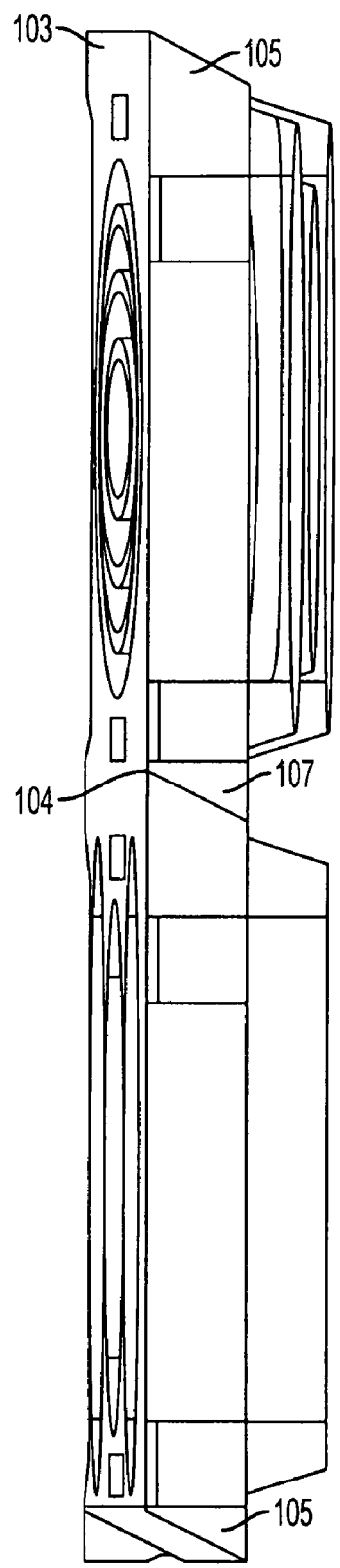
FIG. 3C is a cross-sectional view taken along line 3C-3C of FIG. 3A.

The top surface 103 and bottom surface 104 extend out and form wedges 105 and 107, respectively (FIG. 3C). The wedges 105, 107 are each offset at an angle, generally about 45 degrees, such that these offsets are complementary to each other, enables the panels 100 to mate smoothly with each other. In additional, the offset of either the top and bottom surfaces of the panel also contributes to the dissipation of wave energy when a wave goes over a panel.

Figure 5:
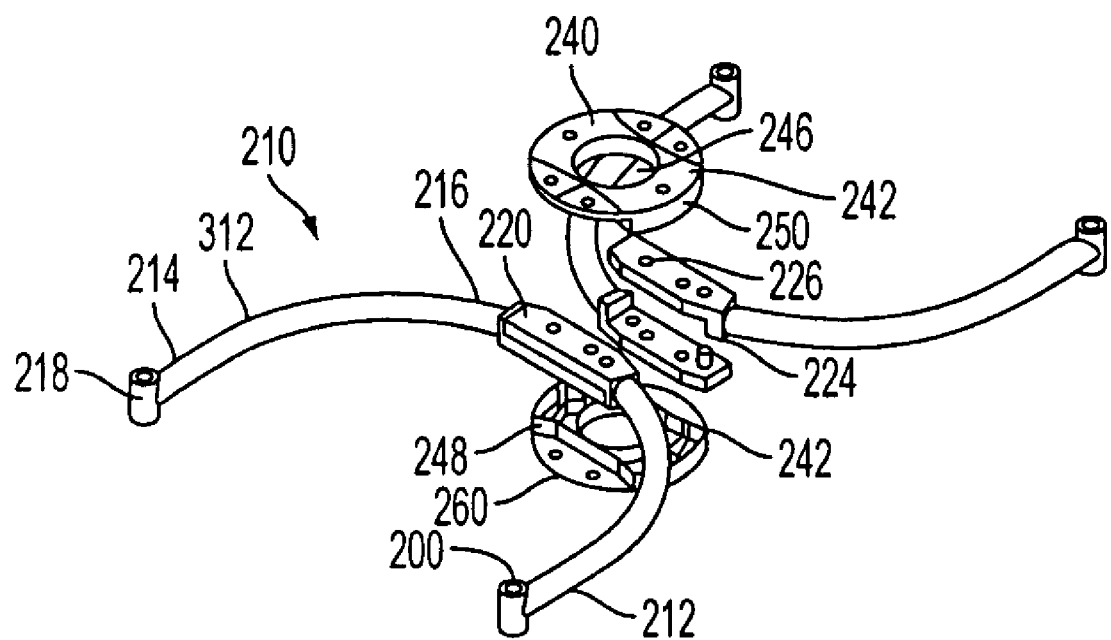
FIG. 5 is an exploded view of a strut and hub assembly.

The rows 200 are connected by means of a hoop connector 210 (FIG. 5). Each hoop connector 210 comprises a pair of struts 212 joined by a locking means 230. Each strut 212 terminates at ends 214 and 216. First end 214 includes connecting means 218 which connects the strut 212 with a panel 100. The connection between a strut 212 and a panel 100 is made using tubing 140 which passes through lug opening 120 and through connecting means opening 218a. A first row of panels are connected to struts behind them, while a second row of panels receives struts that are in front of them. Second end 216 terminates in a lock means 220 which receives a corresponding lock means 220 from a second strut, and which lock means 220 is in turn received within hub members 242 to connect rows of panels. Each lock means 220 includes a prong 224 and at least one opening 226 into which the prong 224 is received by means of a press fit or snap fit.

In one embodiment, strut 212 can be manufactured from LLDPE plastic, aid has an arcuate form, such as that of a quarter circle, with a diameter of about 5 inches, a wall thickness of about one-quarter inch, and a length of about 6 feet. Plastics other than LLDPE can be used to manufacture the struts. Hoop connector 210 can also be formed as an integrated unit rather than being assembled from components.

The pattern of distribution of hoop connectors 210 to connect rows of panels allows the structures to recoil under extreme wave conditions, and then rest under calmer wave conditions. The hoops 210 allow the force exerted upon the system to be transferred to the cables and thereby reduce the stress on the structure. Because the panels 100 of the system are tapered, the progress of a wave is slowed and the jets of water dissipate between the various rows of panels.

Hub 240 is used for joining the struts to form a particular unit, and hub 240 can also be used as a means to attach a panel to a piling 260, the piling 260 being received through the opening 246 of hub 240. Each hub 240 comprises a pair of hub members 242, each hub member having an opening 246 therethrough, the opening being sized and shaped such that a piling 260 can be received therethrough. In the embodiment shown in FIG. 5, hub 240 is circular with a centrally located, circular opening, but other shapes of hub and opening can be developed and utilized, provided they are capable of receiving a piling therethrough, and such variations are considered to be within the scope of the present invention.

Hub member 242 includes an arcuate wall 248 on each side of opposite sides of opening 246 and a panel 250 between the walls 248 and on opposite sides of opening 246. A plurality of holes 260 are dispersed on each hub member 242 to receive connector prongs 224 from lock means 220 to receive a strut 212 by means of either a press fit or a fastener.

Each pair of hub members 242 have a structure that is complementary to the other, such that the hub members 242 can be readily connected to each other.

Hub members 242 can be manufactured from an HDPE structural foam plastic.

Figure 6C:
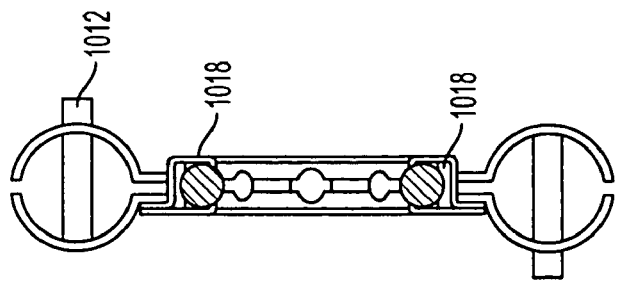
FIG. 6C is a sectional view taken along lines 6C-6C of FIG. 6A.
Figure 6B:
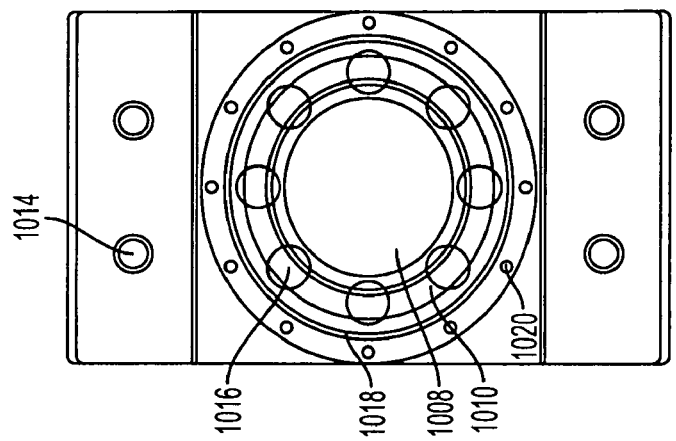
FIG. 6B is a top plan view.
Figure 6A:
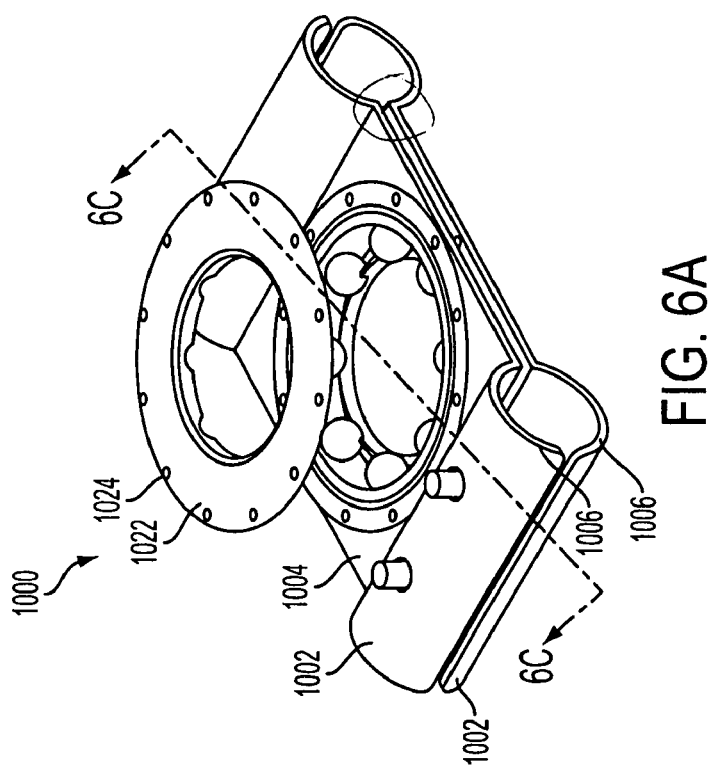
FIG. 6 illustrates an alternate hub embodiment, shown in a plan view (FIG. 6A).

Another hub embodiment 1000 (FIG. 6) can be employed for fastening embodiments of the present invention to piles 260. Hub 1000 comprises a two hub members 1002, which may have structures that are complementary to one another. Hub member 1002 comprises a body 1004 which terminates in a pair of arcuate ends 1006. The arcuate ends 1006 will also serve as means for retaining struts 212 when the hub is assembled. Body 1004 includes an opening 1008 extending therethrough. Proximate the opening 1008 is a channel 1010 having the same configuration as the opening 1008, channel 1010 serving as a bearing retaining means.

On each end 1006 of hub member 1002 is both a prong 1012, and a prong receiving opening 1014. When the hub is assembled, the prong 1012 of one member will be received within the receiving opening 1014 of the other member (FIG. 6C), and a strut 212 will be retained therebetween.

A plurality of bearings 1016 are inserted into channel 1010 and are generally spaced about 45 degrees apart from one another, allowing for smooth movement along pile 260, such that bearings 1016 will contact the surface of pile 260. Thus, during daily tide changes, embodiments of the present invention will rise and fall with the tide, preventing damage to the pile 260 and the hub 1000 from repeated contact with the each other.

An elastomeric cushion 1018, which may be in the form of an O-ring, is positioned beyond the bearings 1016 within hub member 1002, A series of openings 1020, formed within hub member 1002, are dispersed around the channel 1010. A bearing retaining means 1022 having a series of holes 1024, with holes 1024 being aligned with openings 1020, is attached to hub members 1002 using a fastener (not shown), the fastener passing through the openings 1020 and holes 1024, thereby retaining the bearings 1016 within the hub 1000. The bearing retaining means 1022 could also be retained using press fit or snap fit components. Alternatively, the hub members 1002 can be joined using fasteners. The bearings 1016 can be manufactured of EDPM rubber, DELRIN® (registered trademark of EI DuPont Co, Wilmington, Del.) or other suitable material. EDPM rubber resists corrosion from exposure to seawater.

Examples of how the various embodiments are attached to the seabed are shown in the Figures which describe security barrier embodiments. The reference numerals for the anchoring components will be the same throughout this specification.

A shackle 160 is attached to one or more lugs 118 near the bottom of a panel 100. A mooring means 280, such as a chain, rope, wire, cable or the like, is attached to the shackle 160, and in turn attached to an anchoring means 290. Anchoring means 290 is embedded in the seabed, and can be selected from one of a variety of known anchoring devices, such as, but not intended to be limited to, an anchor, a MANTA RAY® anchoring (registered trademark of Foresight Products, LLC, Commerce City Colo.), a pyramidal shaped mooring, a screw anchor or other form of dead weight, such as but not limited to, a block of concrete, used for anchoring vessels. The anchoring means can also be a pile 260 driven into the seabed, but when piles 260 are used, attachment is with a hub 240 or 1000.

The tubing 140 used to connect panels 100 is an EDPM marine-grade rubber. One embodiment employs EDPM rubber tubing of 50-60 durometer, having an outside diameter of about 2 inches with an inside diameter of about one inch, with a wall thickness of about one-half inch. This type of tubing enables the movement of panels within an ocean unit or the like, yet allows for the retention of the unit's configuration, such that when a breakwater or barrier unit is struck by a vessel, the elasticity of the tubing allows the unit to expand and absorb the impact, and then allow it to return to its initial configuration. Tubing 140 is characterized by a 600% elongation, that is, being able to stretch about 6 times its length before breakin. EDPM rubber is known within the industry as being resistant to severe weather conditions, ozone and oxidants, and for having excellent color stability and heat resistance.

Figure 7A:
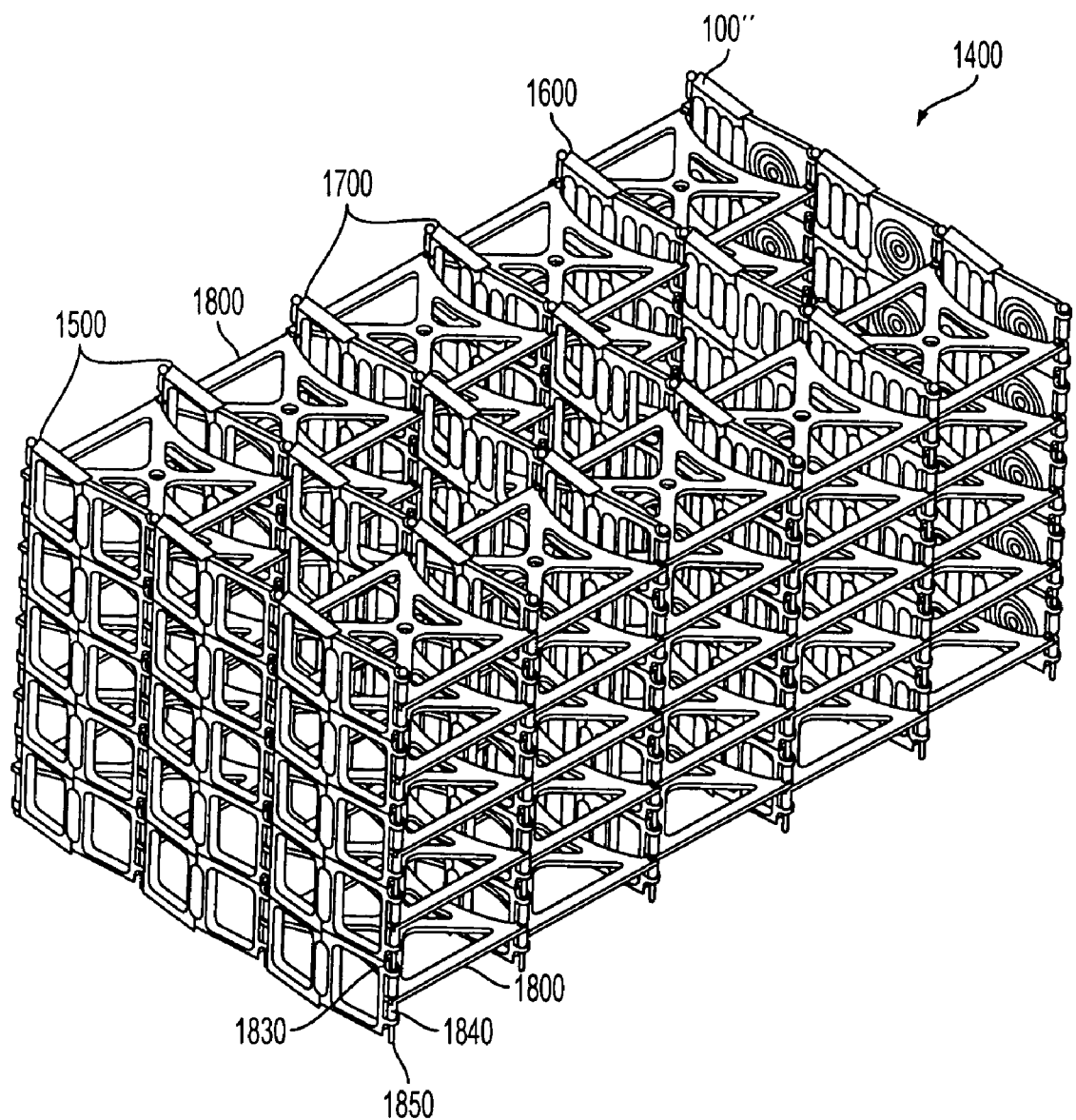
FIG. 7A is a plan view of another embodiment of a wave attenuator.

Another embodiment of wave attenuator is shown in FIG. 7A. This embodiment 1400 is considered to be a passive system, because it allows the wave energy to propagate through the structure, and diminish in strength as the wave passes through the rows of the structure. A difference between this embodiment 1400 and embodiments such as shown in 300 and 400, is the lack of surface area within the first rows of the structure 1400 and the increase in surface area with each row of structure. This embodiment uses several different types of panel to accomplish wave height reduction.

In this example, four different panels are employed, the first panel being panel 100, described earlier, or panel 100', which differs from panel 100 in that all of the apertures (passageways) 114 are the same size, and the absence of ridges on the panel's front surface. The second panel 1500, third panel 1600, and fourth panel 1700 will be described in later paragraphs.

Figure 7B:
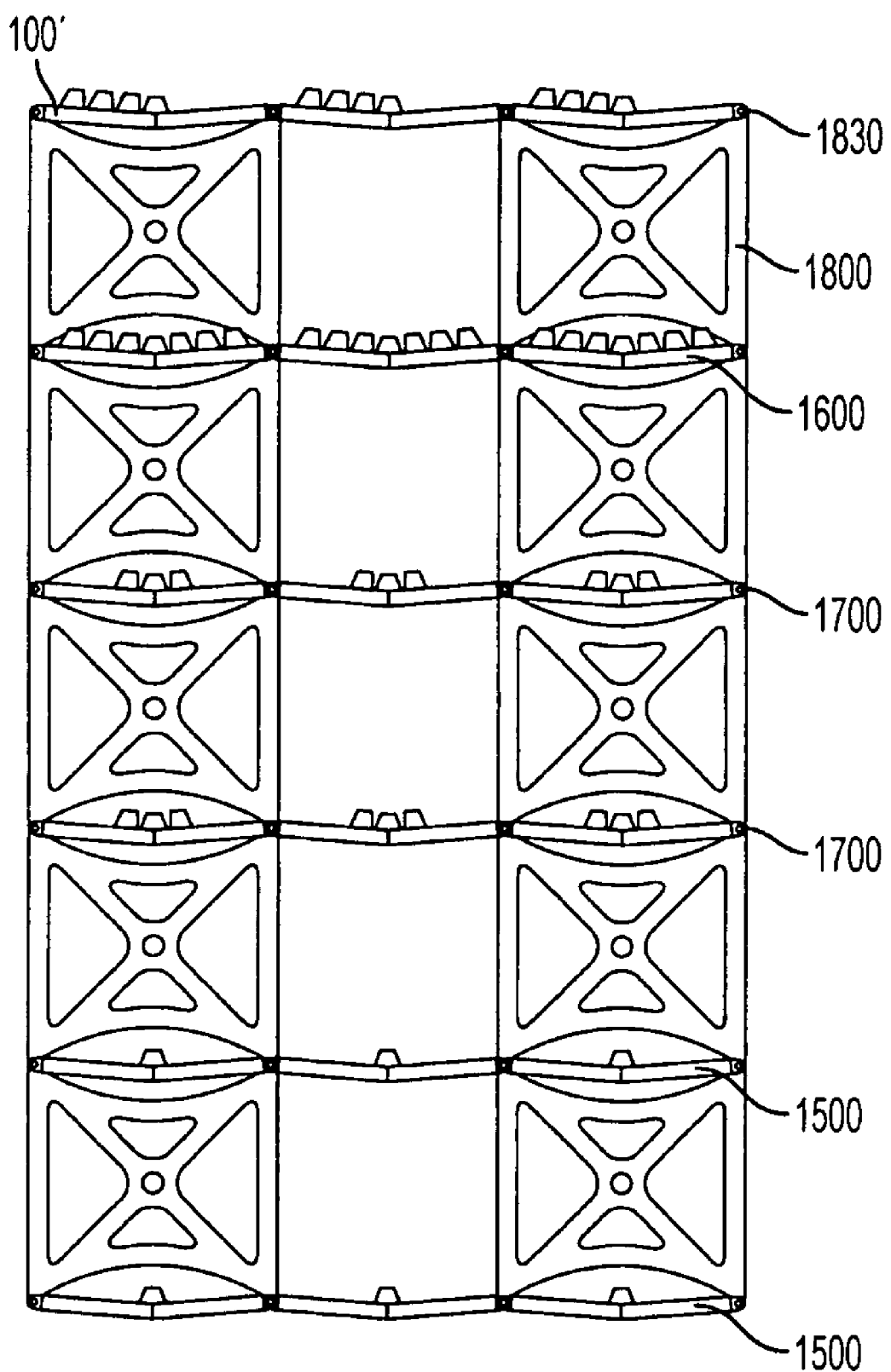
FIG. 7B is a top plan view of the embodiment of FIG. 7A.

Panel 100' is considered to be closed on one side, while panels 1500, which occupy the first two rows as shown in this particular embodiment, is considered as being 75% open. Panel 1700, which occupies the second two rows of this particular embodiment, is considered to be 50% open, and panel 1600, is considered to be 25% open. The percentage open is meant to describe that portion of the front surface area of the panel that allows passage of water or other substances. The panels are connected by a connector embodiment 1800 which is received between lugs on the panels in conjunction with a rod 1830, spacer 1840, and ball nut 1850. In this example, the spacer 1840, ball nut 1850 and rod 1830 are made of the same material, which is DELRIN®, although materials having equivalent properties can be substituted therefor. FIG. 7B, a top plan view, provides a clearer view of how the different panels are distributed within this particular embodiment.

Panel 100' as described briefly above, is essentially similar to panel 100 (FIG. 2), but the apertures (passageways) in panel 100' are of the same size. The grooves 116 on the front surface of panel 100' are similar to the grooves on panel 100. Panel 100' also lacks the ridges that are present on panel 100's front surface.

Figure 8A:
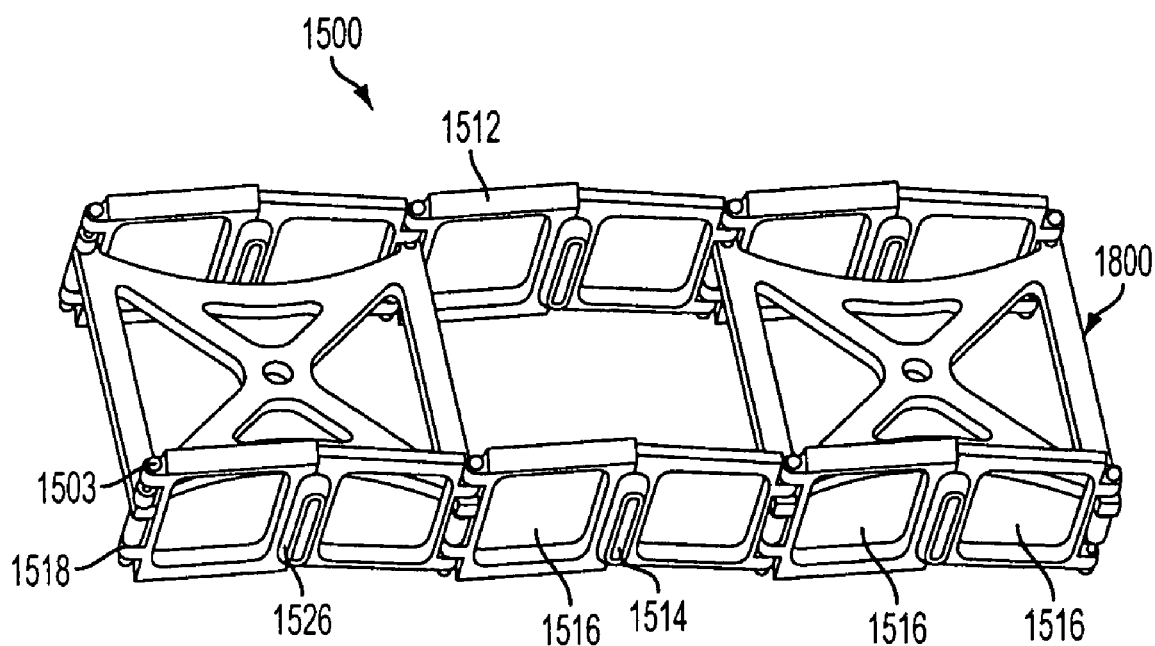
FIGS. 8-10, A-C, each represent plan, top plan and frontal views, respectively, of different panel embodiments.
Figure 8B:
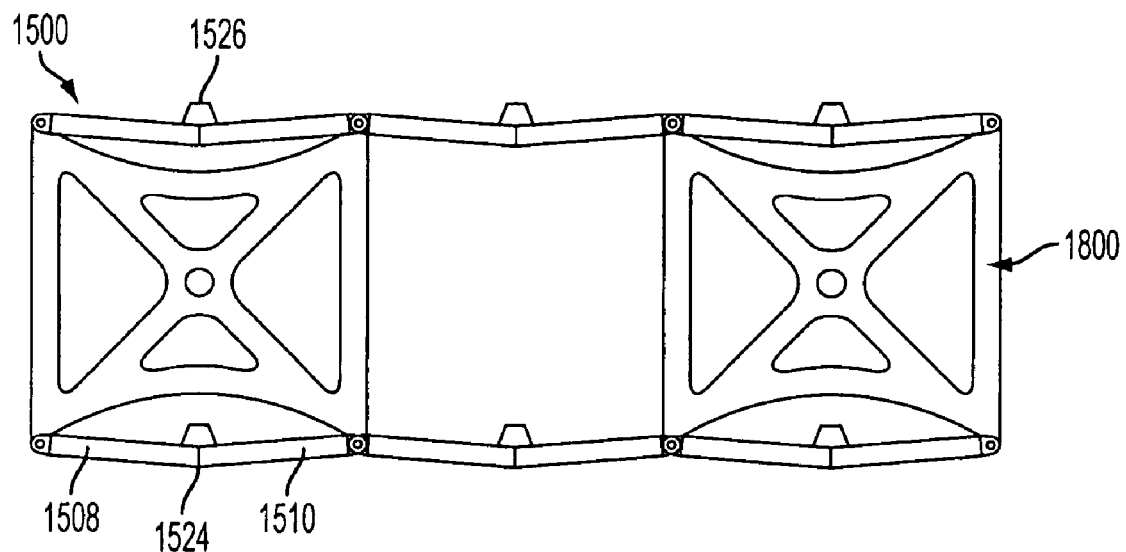
Figure 8C:
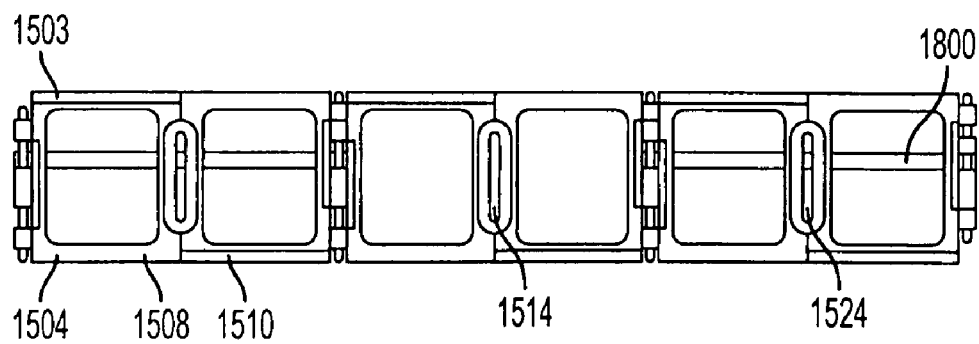

Panel 1500 (FIG. 8A-C) comprises a front 1501, back 1502, top 1503, bottom 1504 and sides 1508 and 1510. Panel 1500, which when formed is generally hollow, but as will be described later, can be coated on the inside with a water resistant foam, and may also contain varying amounts of water, or other material such as ballast, depending upon the ultimate use of a particular panel.

On a portion of top surface 1503 is a deflector 1512, which serves to create turbulence and dissipate wave energy. The sides 1508 and 1510 are offset with respect to one another (FIG. 8B), with a slotted aperture (or passageway) 1514. Aperture (passageway) 1514 is bounded by an inner wall 1515, and one or more ridges 1517 are present, extending from the inner wall 1515 into the aperture 1514. The apertures

1514 is tapered, and has a large opening 1524 and a small opening 1526, the larger opening 1524 being positioned to face an oncoming wave.

Each side 1510 contains a large portal 1516 for passage of water therethrough. Each side terminates in a pair of lugs 1518, which include an opening 1520 through which wire, cable, pipe or other attachment means can either pass through, be hooked onto, into or otherwise joined to. As shown in the drawings, the lugs 1518 on side 1508 are offset with respect to the lugs 1518 on side 1510, such that when a pair of panels is put together in a side by side arrangement, the lugs 1518 of a first panel will align with the lugs 1518 of a second panel, enabling the two panels 1500 to be connected by a cable, wire, or other means (to be described later) used to connect the panels.

Figure 9A:
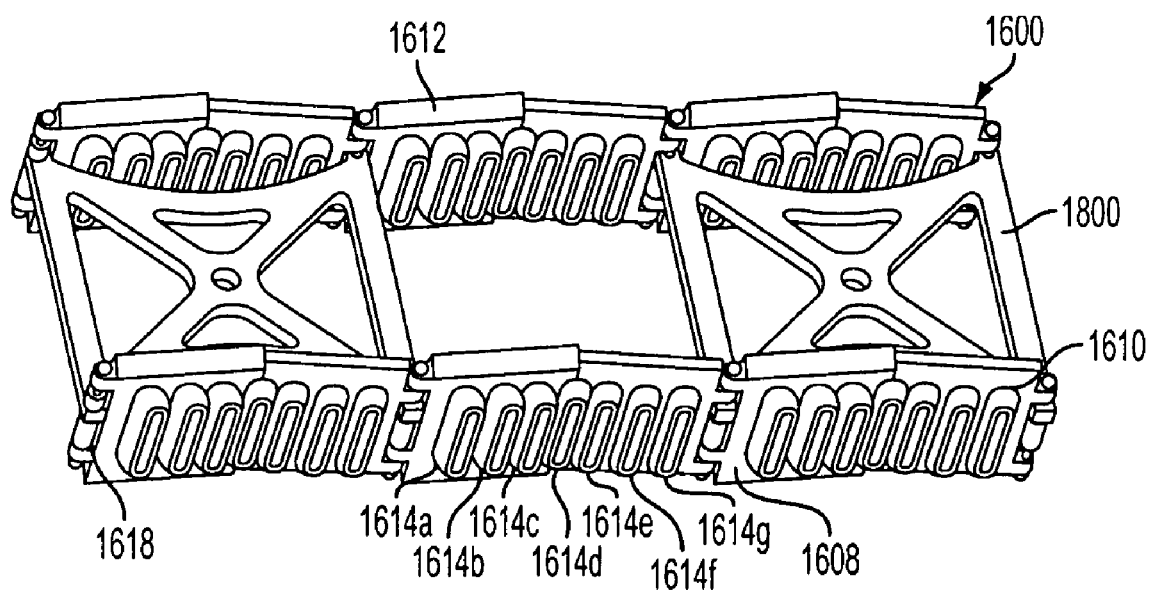
Figure 9B:
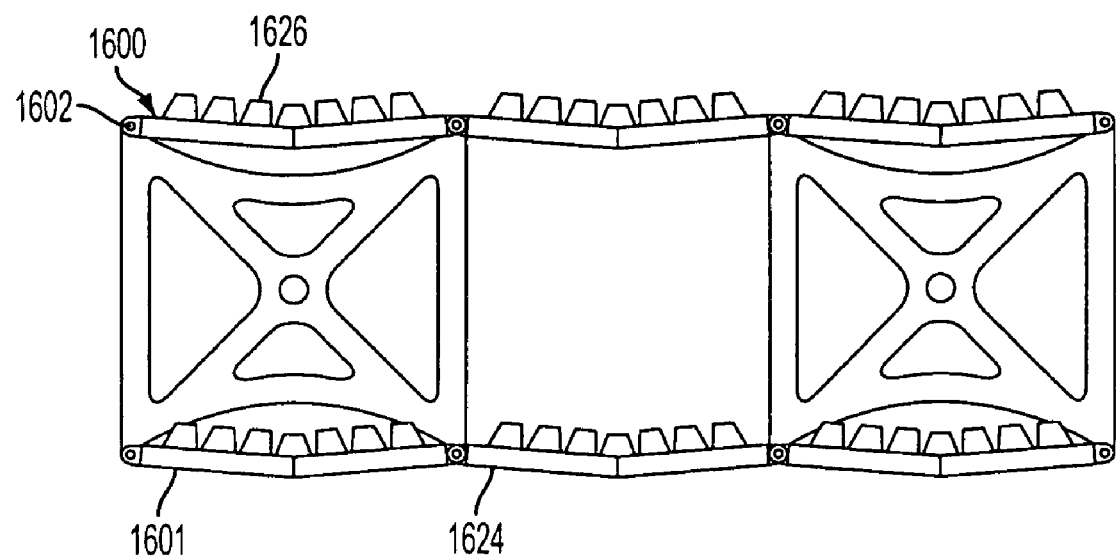
Figure 9C:
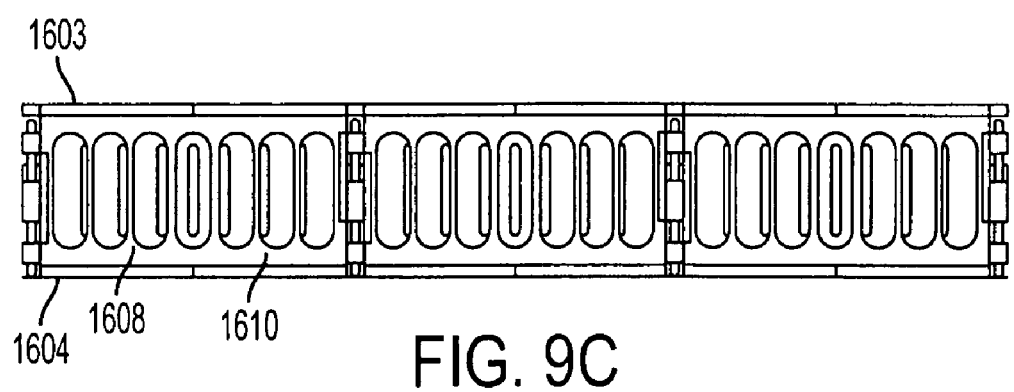

Panel 1600 (FIG. 9A-C) comprises a front 1601, back 1602, top 1603, bottom 1604 and sides 1608 and 1610. Panel 1600, which when formed is generally hollow, but as will be described later, can be coated on the inside with a water resistant foam, and may also contain varying amounts of water, or other material such as ballast, depending upon the ultimate use of a particular panel.

On a portion of top surface 1603 is a deflector 1612, which serves to create turbulence and dissipate wave energy. The sides 1608 and 1610 are offset with respect to one another (FIG. 9B), with a plurality of slotted apertures (or passageways) 1614*a-g*. Each aperture (passageway) 1614*a-g* is bounded by an inner wall 1615, and one or more ridges 1617 are present, extending from the inner wall 1615 into the apertures 1614*a-g*. The apertures 1614*a*-1614*g* are tapered, and each aperture has a large opening 1624 and a small opening 1626, the larger opening 1624 being positioned to face an oncoming wave.

Each side terminates in a pair of lugs 1618, which include an opening 1620 through which wire, cable, pipe or other attachment means can either pass through, be hooked onto, into or otherwise joined to. As shown in the drawings, the lugs 1618 on side 1608 are offset with respect to the lugs 1618 on side 1610, such that when a pair of panels is put together in a side by side arrangement, the lugs 1618 of a first panel will align with the lugs 1618 of a second panel, enabling the two panels 1600 to be connected by a cable, wire, or other means (to be described later) used to connect the panels.

Figure 10A:
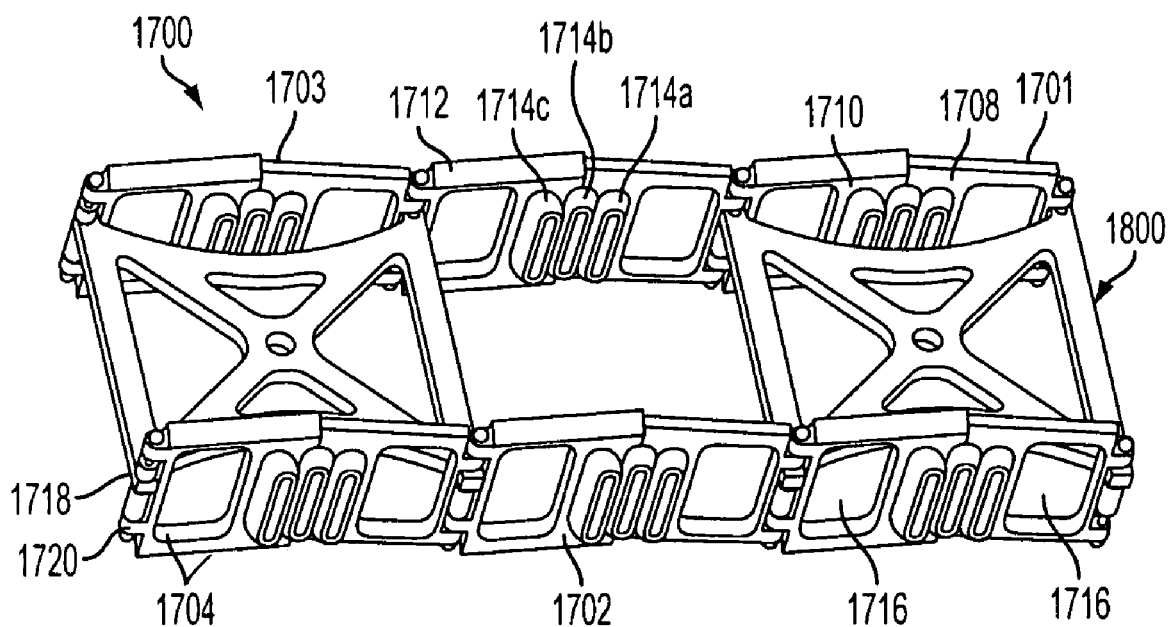
Figure 10B:
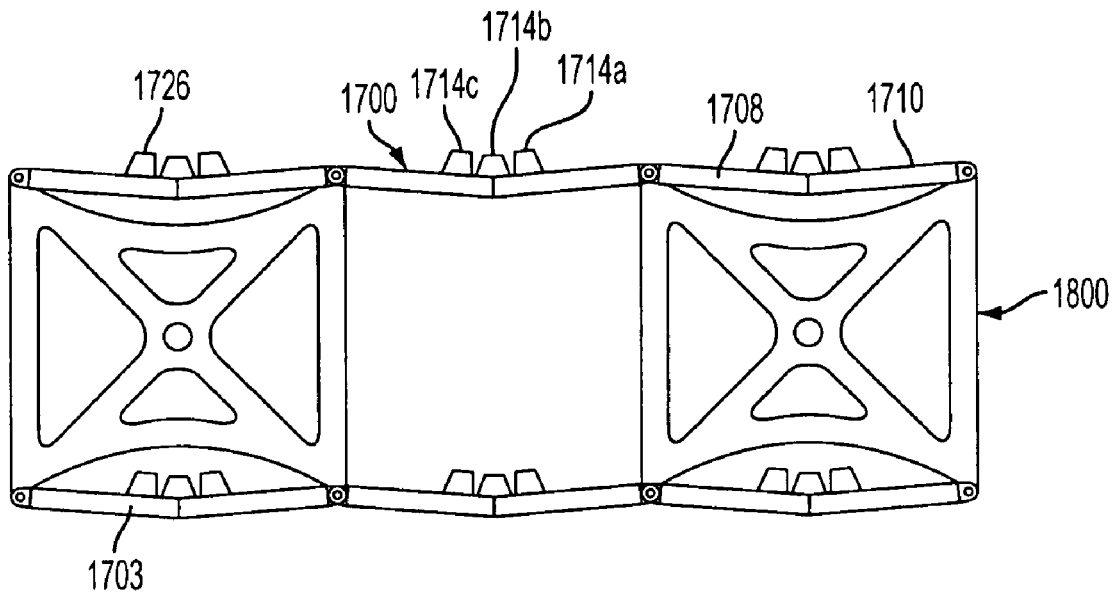
Figure 10C:
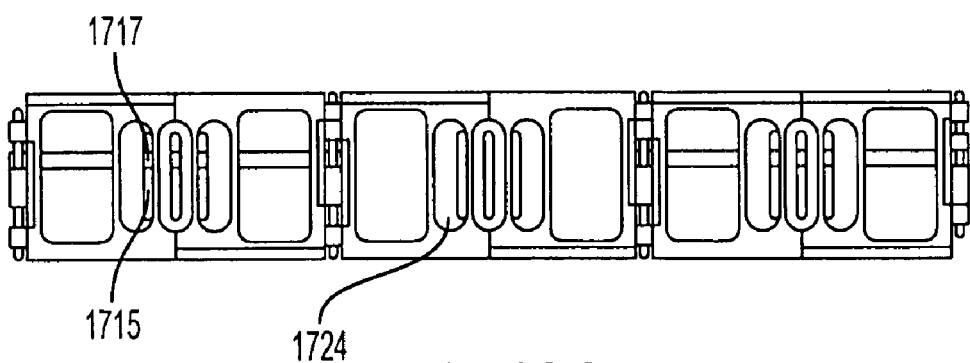

Panel 1700 (FIG. 10A-C) comprises a front 1701, back 1702, top 1703, bottom 1704 and sides 1708 and 1710. Panel 1700, which when formed is generally hollow, but as will be described later, can be coated on the inside with a water resistant foam, and may also contain varying amounts of water, or other material such as ballast, depending upon the ultimate use of a particular panel.

On a portion of top surface 1703 is a deflector 1712, which serves to create turbulence and dissipate wave energy. The sides. 1708 and 1710 are offset with respect to one another (FIG. 10B), with slotted apertures (or passageways) 1714*a*, 1714*b*, and 114*c*. Each aperture (passageway) 1714 is bounded by an inner wall 1715, and one or more ridges 1717 are present, extending from the inner wall 1715 into the aperture 1714. The apertures 1714*a*-1714*c* are tapered, and each aperture has a large opening 1724 and a small opening 1726, the larger opening 1724 being positioned to face an oncoming wave.

Each side 1710 contains a large hole 1716 for passage of water therethrough. Each side terminates in a pair of lugs 1718, which include an opening 1720 through which wire, cable, pipe or other attachment means can either pass through, be hooked onto, into or otherwise joined to. As shown in the drawings, the lugs 1718 on side 1708 are offset with respect to the lugs 1718 on side 1710, such that when a pair of panels is put together in a side by side arrangement, the lugs 1718 of a first panel will align with the lugs 1718 of a second panel, enabling the two panels 1700 to be connected by a cable, wire, or other means (to be described later) used to connect the panels.

Referring to FIG. 7A, the reduced surface area in the front of the structure 1400 allows the wave to pass into the structure and become trapped within its rows 200, thereby expending more energy and reducing the wave height. Panels can be removed from the structure 1400 to leave larger gaps in the structure. As in the case of the previous embodiments, panels can be removed before the unit is deployed, or can be removed from a deployed unit. Without being bound to any one theory; it is believed that the wave energy is funneled and sorted within the structure 1400, with multiple streams of energy meeting at various points in and around the structure.

While the embodiment 1400 shown in FIG. 7A employs 6 rows of panels, the number of panels, the number of panel rows, and the types of panels that may be deployed in any one structure can be varied with a variety of combinations and permutatations of panels, which offer a variety of porosities (that is, percentage openings).

Figure 11:
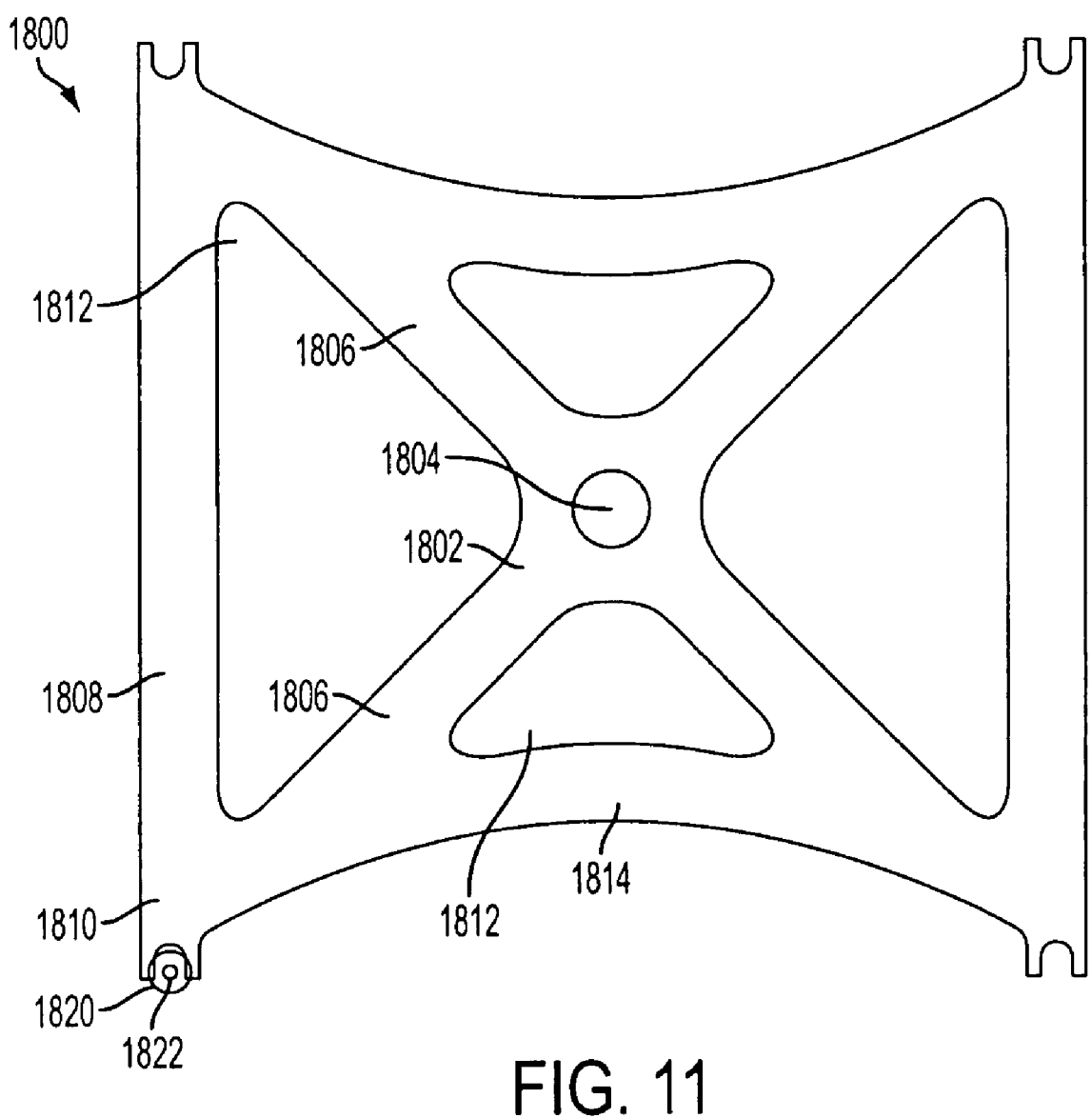
FIG. 11 illustrates a connector embodiment, shown in FIG. 7A.

The various panels are joined by connector 1800 (FIG. 11). In contrast to hub 240 and connector 1000, connector 1800 is a single piece that is manufactured from a plastic. In one embodiment, connector 1800 comprises polyethylene, but other comparable plastics, materials, or fiberglass could be substituted therefor. Connector 1800 could also be fabricated from several components in a manner similar to the assembly of hub 240, and such an equivalent structure is considered to be within the scope of the present invention.

Connector 1800 comprises a main body 1802 with a central opening 1804. Two pair of arms 1806 extend out from body 1802, where they meet sides 1808 at ends 1810. A series of portals 1812 are formed between the arms 1806, sides 1810, and members 1814. In the exemplary embodiment illustrated, the sides 1810 are characterized by being generally straight, and the members 1814 are arcuate. Adjacent each end 1810 is a lug 1820 containing an opening 1822 through which lug a cable 150, tubing 140, pipe or the like can be passed through, to connect the connector 1800 with a panel 100. Although not intended for use with pilings 260, connector 1800 could be modified so that opening 1804 is sufficiently wide to receive a piling 260 therein. In one embodiment, a DELRINO rod 1830 is used to connect the panels, in conjunction with a spacer 1840 and ball nut 1850.

The various sized openings and portals with connector 1800 act in a way that, without being bound to any theory, the wave reacts as if it has touched the bottom of the seabed, making it break. The connector's 1800 various shaped aperture and portals allow water energy to drop vertically through the structure, creating additional jets of energy vertically which commingle with the variety of horizontal jets of water that are distributed through the panels. The vertical upwelling that occurs within the structure now is thought to be channeled through these connectors' 1800 apertures and portals, and while this additional upwelling activity may increased the load on the structure 1400, they also increase system performance.

Security Wave Attenuator Embodiment

These embodiments 500, 600, and 700 (FIGS. 13A-15C) are designed for protection of a beach, harbor, marina, port, military base, shipyard or boatyard, dam, power plant, bridge, ship docket in a port, nuclear reactors, vessels carrying hazardous materials or substances such as oil, liquefied natural gas or the like, river, or other waterway against intrusion by an external threat. Examples of such external threats can be, but are not intended to be limited to, boats, trespassers, divers, or other means of entry. Because these embodiments comprise a plurality of panels 100, they also function as wave attenuators, protecting the area from the effects of waves. These embodiments can be illustrated in one of three general forms of barrier.

A first barrier embodiment is designated as a small boat barrier 500 ("SBB", FIG. 12), which comprises a plurality of panels 100 joined to each other by tubing 140 and cable 150 that extends through lug openings 120 on the side of each panel, and which cable 150 terminates at a shackle 160. When the panels 100 are used in the various boat barrier embodiments, the panels are used in a vertical orientation, rather than the horizontal orientation used when the panels are part of a wave attenuator or breakwater embodiment (FIG. 2). The shackles 160 positioned near the bottom of the panels 100 are used to moor the barrier 500 to the seabed. A mooring means 280, such as a chain, rope, wire, cable or the like, is used to connect the barrier 500 to an anchoring means 290. Anchoring means 290 is embedded in the seabed 292, and can be selected from one of a variety of known anchoring devices, such as, but not intended to be limited to, an anchor, a MANTA RAY® anchoring (registered trademark of Foresight Products, LLC, Commerce City Colo.), a pyramidal shaped mooring, a screw anchor or other form of dead weight, such as but not limited to, a block of concrete, used for anchoring vessels. The anchoring means can also be a pile 260 driven into the seabed, but when piles 260 are used, the barrier 500 is attached to the pile using a hub 210 or 1000.

Beneath the panels a diver net 610 can be attached, to close the gap between the bottom panel and the seabed to prevent intrusion by divers. Diver net 610 can be manufactured from a material such as polyethylene rope, rubber, EPDM rubber, nylon, polyethylene, polypropylene, plastics, or other materials commonly used in the industry. Diver net 610 is attached to the panels 100 using the cabling 150 used to join the panels 100 together.

Additional layers of protection can be added to small boat barrier 500, such as a strip of protective wire 620 such as barbed wire, razor wire, or the like. A barricade 630 can also be attached to the panels 100, such as a bumper, mounted on both sides of the panels. Bumper 630 is mounted below the water line, but could also be positioned above the water line, or as desired by the user of the barrier. A sensor 640 can be mounted to one or more of the panels; in the embodiment illustrated, sensor 640 is a surveillance camera, which is connected to a monitoring system (not shown). Additionally, means are provided for the addition of ballast, where necessary, to the barrier 500.

This barrier embodiment 500 can be used to protect against divers, trespassers, and what are considered to be small boats, that is, those boats that are up to about 20 feet in length. Such boats can include, for example, Zodiac boats, which have been utilized in terrorist attacks against naval targets.

The components of the small boat barrier 500 are considered to be portable, and can be stacked on a site, such as a beach, warehouse, or other location.

Medium and Large Boat Barrier Embodiments

The medium boat barrier 600 ("MBB") is a somewhat portable structure. Similar to the SBB barrier 500, the MBB barrier 600 protects against trespasser intrusion, and protects against what are considered to be medium sized bats, such as those that have a length of up to about 60 feet.

Figure 13B:
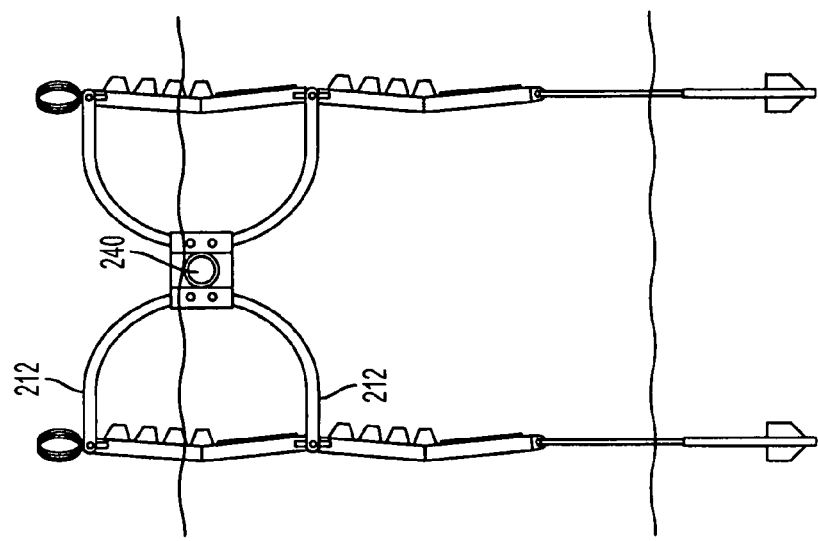
FIG. 13B illustrates a medium boat barrier embodiment (Side view).
Figure 13A:
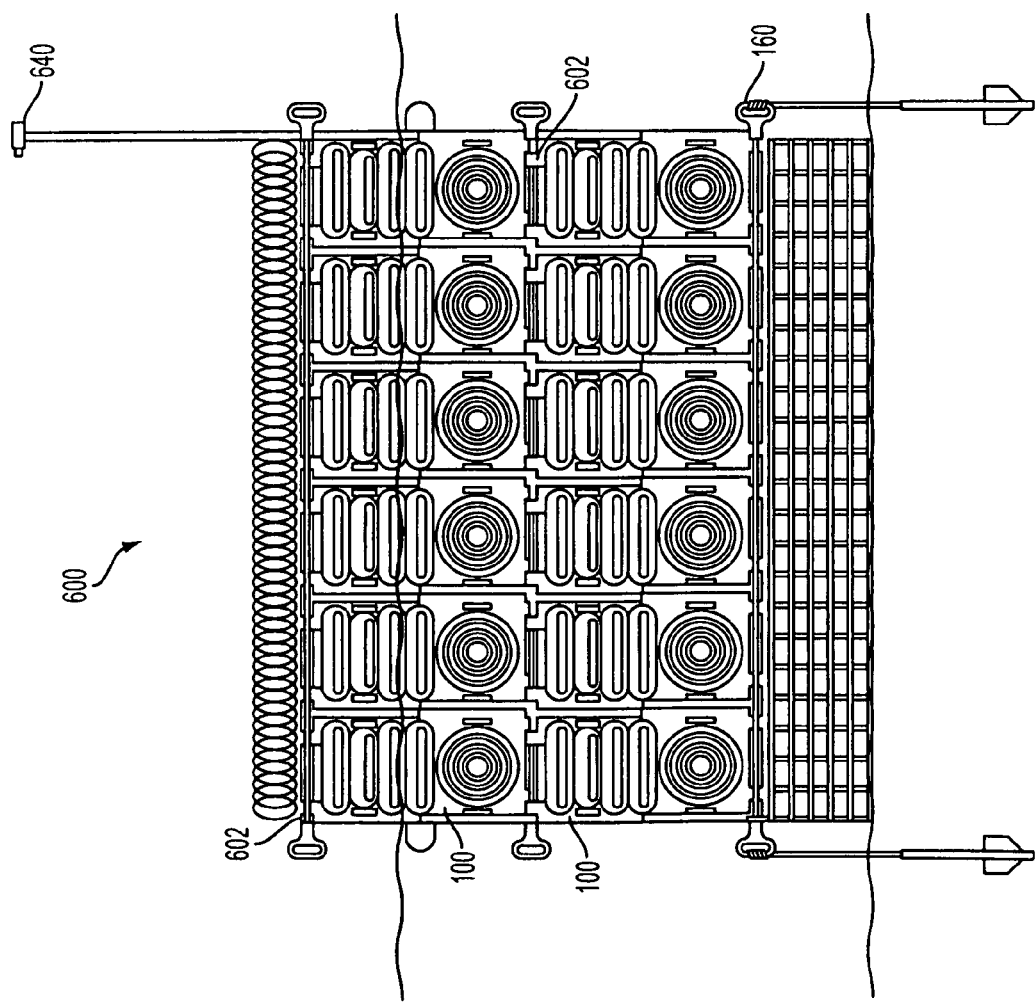
FIG. 13A illustrates a medium boat barrier embodiment (Front view).
Figure 14:
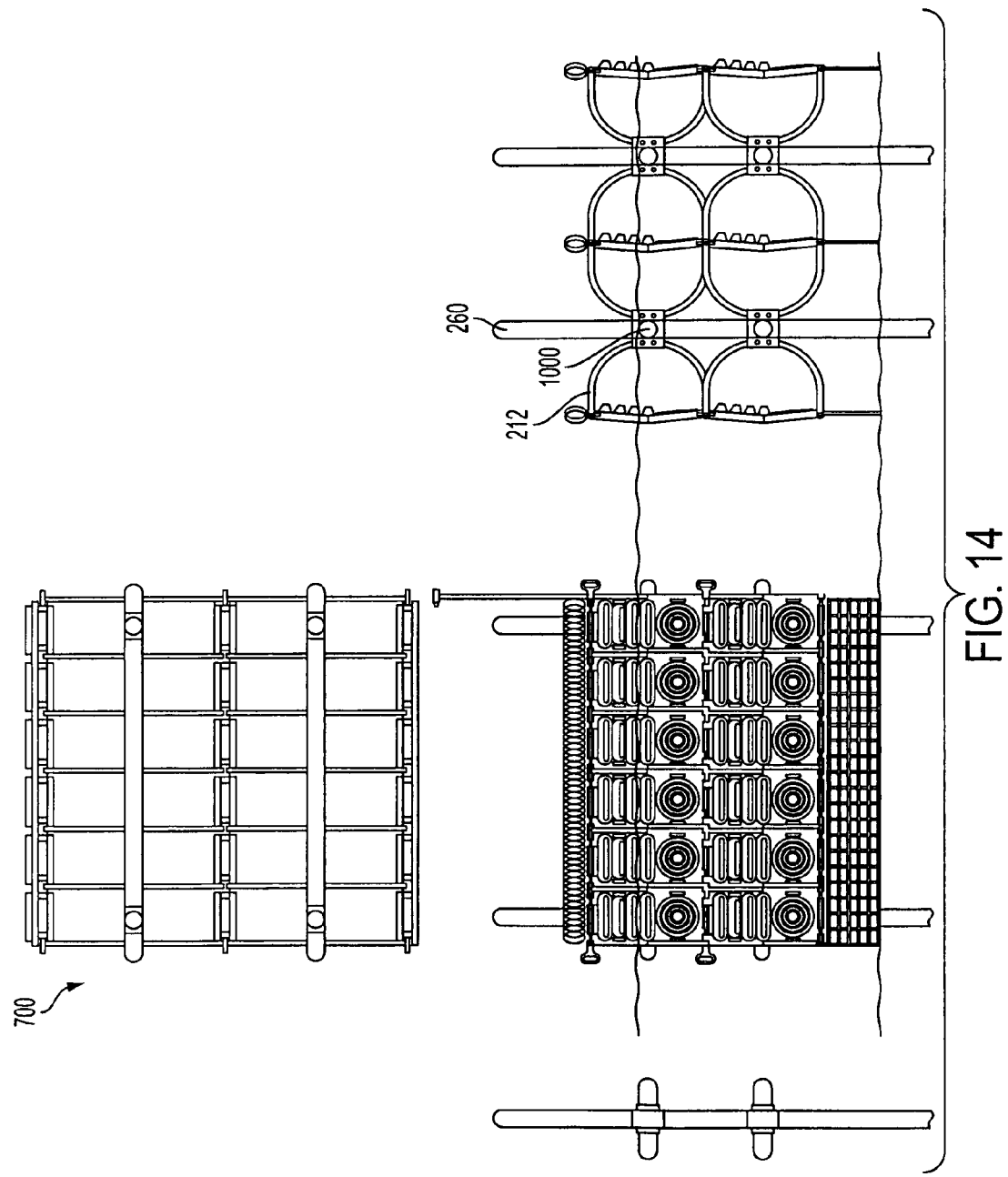
FIG. 14 illustrates a large boat barrier embodiment.

Referring to FIGS. 13A-C, medium barrier 600 comprises dual rows of panels 100 connected by cables 602 and terminating in shackles 160, in the same manner as small boat barrier 500. The medium barrier 600 illustrated is shown as comprising two rows of panels 100 joined together by hub 240 and struts 212. The systems and features that may be incorporated in the small boat barrier 500 embodiment may also be included in medium boat barrier 600 embodiment. The medium boat barrier 600 differs from the small boat barrier 500 embodiment in that the medium boat barrier 600 utilizes steel ERW (Electric Resistance Welded) pipe 702 passing through the connectors horizontally. The panel 100s' buoyancy acts as a portable support for this pipe. Both the diameter of and the thickness of the pipe may vary. The pipe will also be a unit connector; pipe terminations may be flanged to join units together. To protect against intrusion by deeper draft vessels, additional hoop connectors may be placed horizontally below the water line.

In another embodiment, a large boat barrier 700 is designed to protect against what are considered to be large boats, such as those having a length of up to about 100 feet, and also against trespassers.

The panels 100 of the large boat barrier 700 (FIG. 14) are held together by an interior lattice of ERW (Electric Resistance Welded) pipe 704 which holds the panels in position.

In other respects, large boat barrier 700 resembles the medium boat barrier 600 embodiment, but differs in that large boat barrier 700 employs ERW pipe 702 tied into steel pilings 260 driven into the soil, instead of anchoring means employed in the small boat 500 and medium boat 600 barrier embodiments. The large boat barrier 700 embodiment may have hull piercing penetrators (not shown) mounted thereon that extend from the ERW pipe 702 to incapacitate an approaching vessel.

It is anticipated that when deployed, large boat barrier 700 embodiment becomes a permanent structure. This embodiment may incorporate all the systems and features of the small boat 500 and medium boat 600 barrier embodiments.

Although the figures have shown these barrier embodiments as being partially submerged, it is to be understood that the depth of the barrier can be controlled, and the barrier can be completely submerged, to prevent covert intrusions. In such an instance, where sensors 640 are mounted on such barriers, the sensors 640 would be contained in appropriate water and/or pressure resistant housings.

One or more sensors 640 can be installed on a panel. A sensor 640 can be used for one or more functions, such as for monitoring or detecting light, sound, movement, or heat, or could be a sonar, radar or lidar sensor. A camera, whether a still, video, or surveillance camera, using either film, video or digital technology would, for purposes of this specification, be considered as a sensor. Sensors for detecting the presence of chemical agents, biological agents, microorganisms such as fungi, bacteria or viruses, microbial by-products such as toxins, etiological agents, explosives, poisons or radiation can also be employed. The sensor can be positioned on an appropriate location on a panel, and the output of the sensor communicated to either a central processing unit (not shown) or other monitoring person or station (not shown) affiliated with the particular system. The output of the sensor 640 can be communicated using suitable electronics or other communication means, and could be either a wired connection, a wireless connection, and could be communicated using the Internet or World Wide Web, as desired by the user. Thus, if an intrusion is detected, appropriate personnel can be contacted and remedial action or response can be undertaken.

Without being bound to any theory, unlike a massive concrete wall that stops a speeding vessel instantly, the boat barrier embodiments of the present invention create a progressive impact to stop a speeding vessel over time. As a result, these energy-absorbing barriers can survive much higher impact velocities than a rigid barrier. Stopping forces on the barrier embodiments of the present invention are very low due to a longer stroke; thus, a solid structure may only move a few inches whereas barrier embodiments of the present invention will move several feet. If a moving object is stopped by a collision, extending the stopping distance will reduce the average impact force.

By transferring the kinetic energy from the moving boat to the barrier, the barrier embodiments of the present invention use a plowing action to stop the boat. The barrier, not the boat, is allowed to deform quickly, which keeps the reaction forces relatively low. When a boat strikes the face of a barrier embodiment of the present invention at high speed, the boat plows into the water behind the barrier. The resulting friction or kinetic energy is transferred to the water behind the row of panels that plumes up and out. By collapsing around the intruding vessel, the barrier embodiments thus hold the vessel in place while security reaction forces, such as police or other authority, can respond. Thus, these embodiments provide different levels of protection, ranging from a portable system characterized by the small boat barrier embodiment to a permanent structure characterized by the large boat barrier embodiment. In the embodiments which employ multiple rows of panels, a layered defense system is provided, because of the redundancy achieved using multiple rows of panels.

Security Gate Embodiment

Figure 15A:
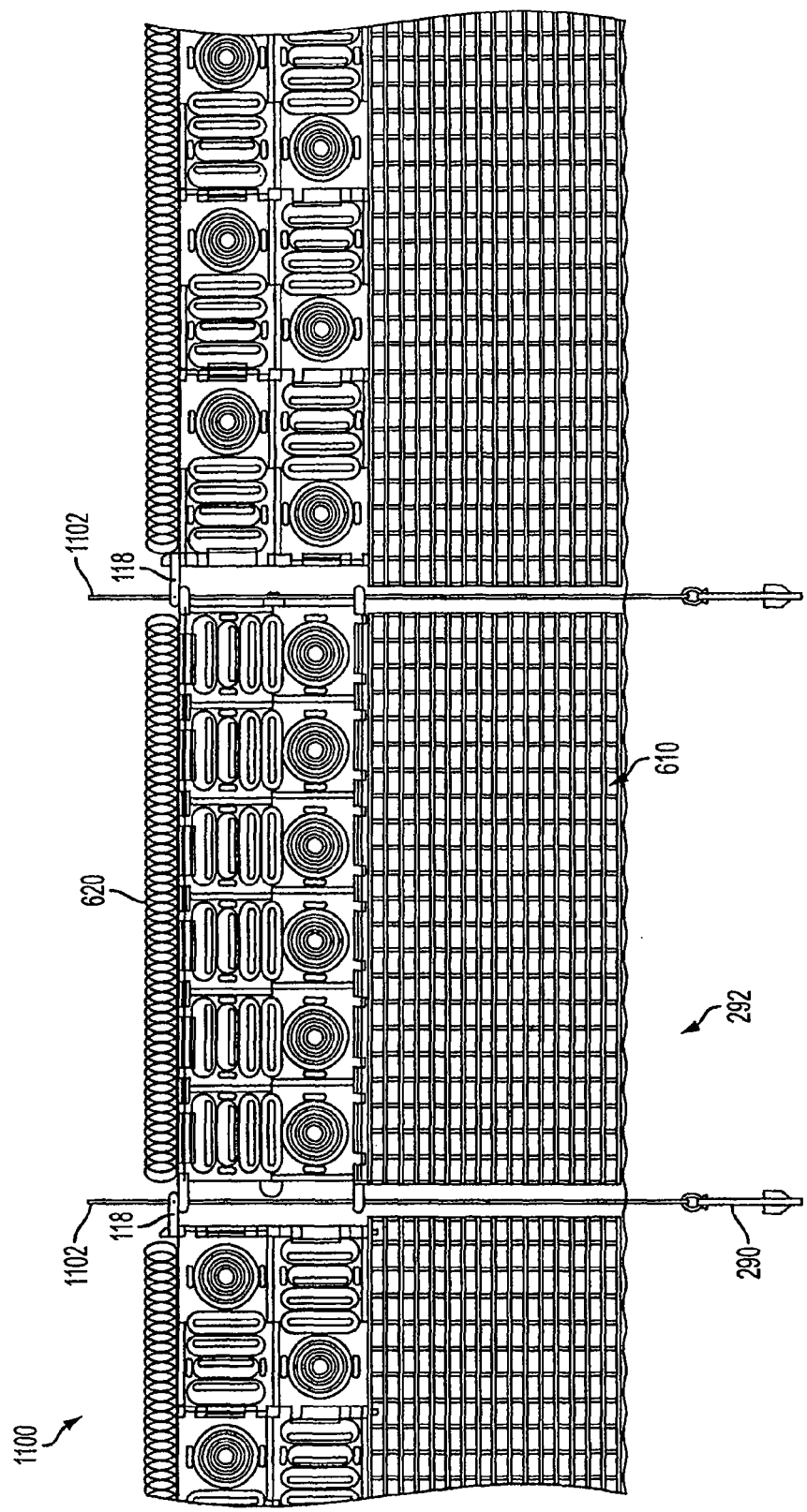
FIG. 15A being a front elevational view.
Figure 15B:
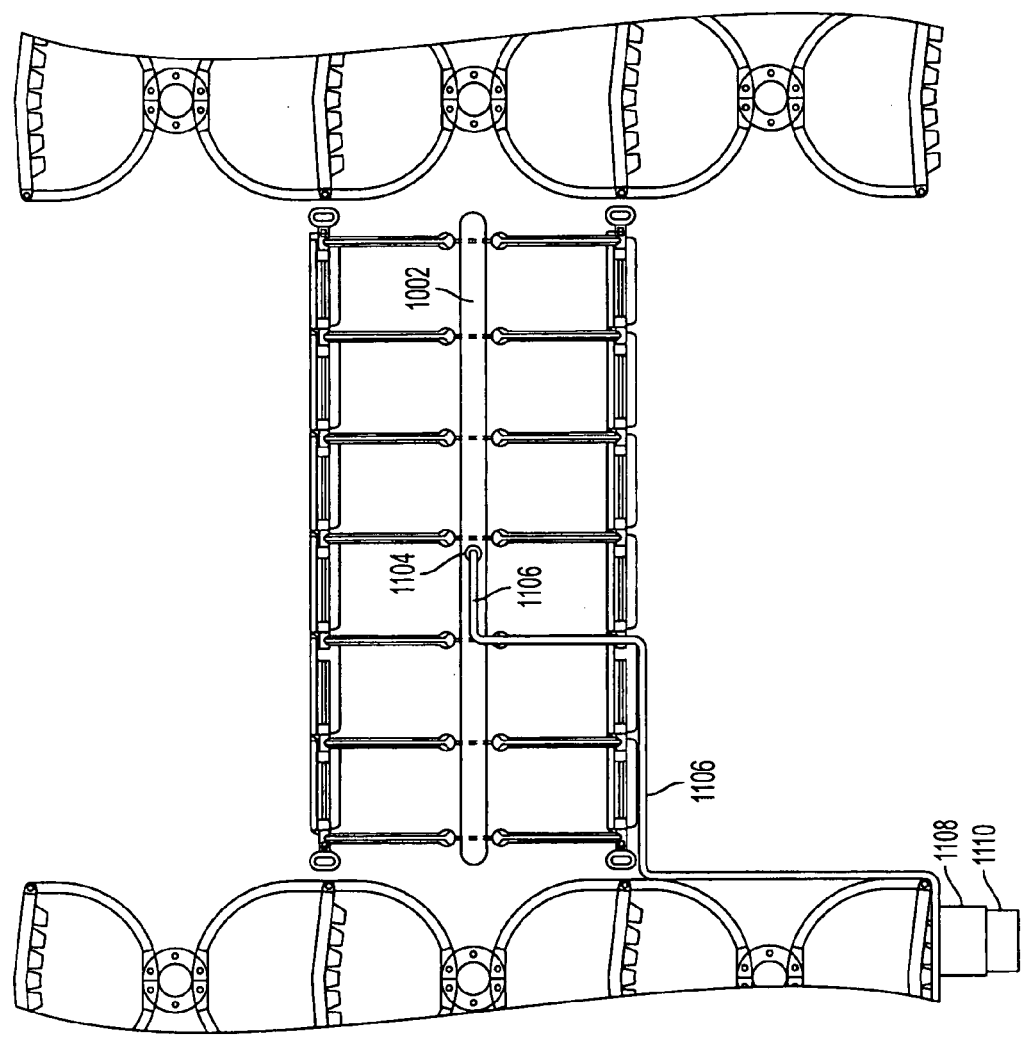
FIG. 15B is a schematic and top plan view and FIG. 15C is an enlarged view of the gate from FIG. 15A.
Figure 15C:
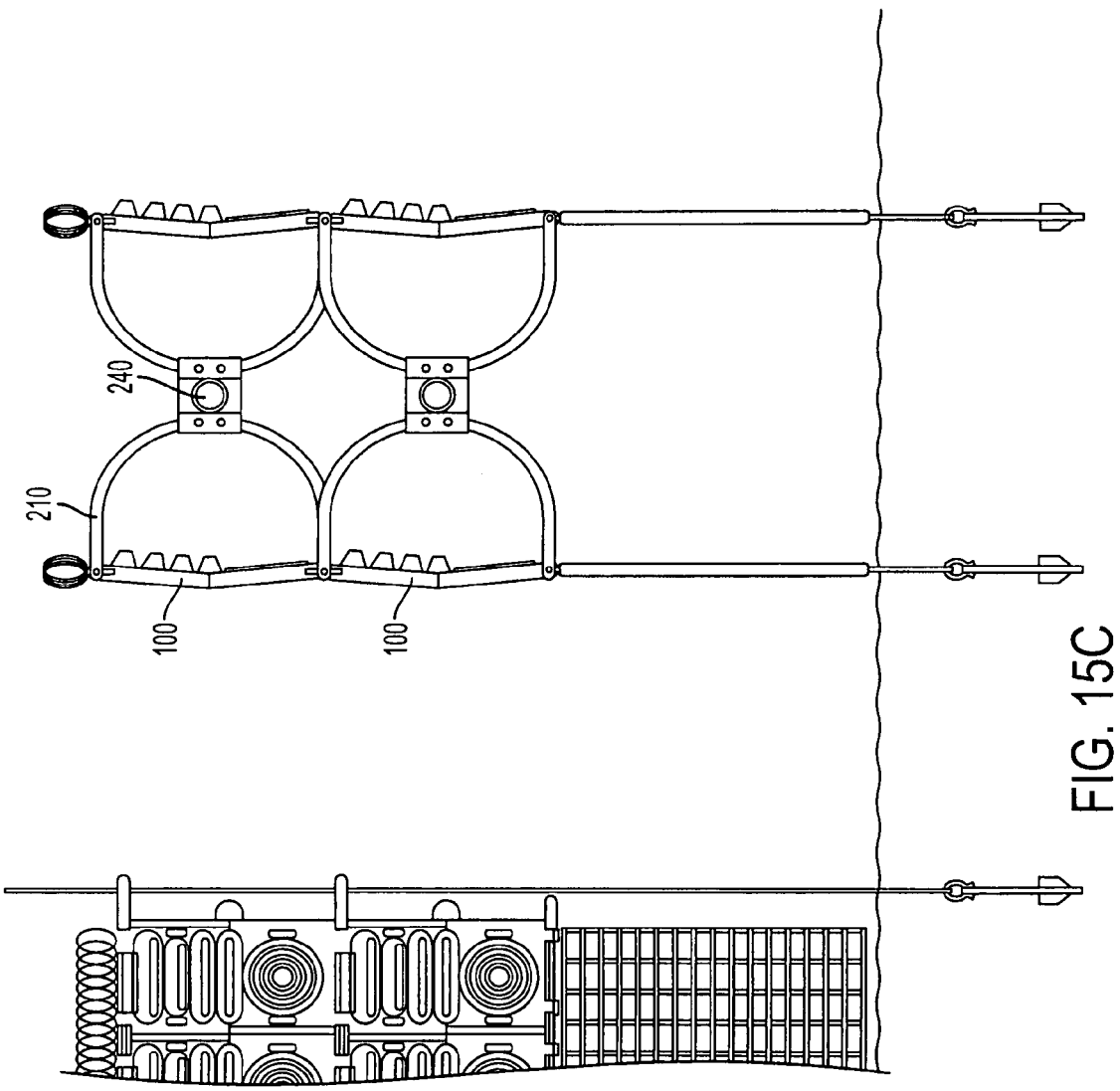

In another embodiment, panels 100 (or any of the other panel embodiments described previously) can be deployed in the form of a security gate embodiment 1100 (FIGS. 15A-C). The panels 100 are connected into rows 200, and the rows 200 connected to each other, using an upright guide 1102, which passes through lugs 118. The guide 1102 can be either a steel cable, wire, or a rod. One embodiment, for example, employs a rod manufactured of DERLIN, but materials having equivalent properties could be utilized. The security gate 1100 comprises panels 100 that are mounted vertically, and an ERW pipe 1002 positioned therebetween. The pipe 1002 is sealed, and an air/water valve 1104 in communication with a hose 1106 is attached to the panels 100 using attachment means known to those skilled in the art. Sufficient slack is left in the hose line for the gate to be raised and lowered. The hose 1106 is connected to a pump 1108, and as the amount of air and water inside pipe 1002 change, the gate will submerge or rise. As shown in FIGS. 15B and 15C, the gate panels 100 are able to slide up and down along guide 1102. Using a communications means 1110 connected to pump 1108, the buoyancy of the pipe 1002 can be controlled and actuated by means of radio, telephone, computer, electronic, or other signals known to those skilled in the art. The communications means 1110 may utilize either wired, or various forms of wireless, communications technology. Pump 1108 can be chosen from any of the pumps known to those skilled in the art and suitable for this purpose.

In the embodiment shown in FIG. 15A, the gate panels are mounted between a pair of inner rows within the structure. This provides stability to the gate, but the gate can be positioned between any pair of rows within the structure. In harbors where a security net, such as a submarine net, is in position to protect against intrusion, one or more boats are required to open the net, and allow vessels in or out of the facility. In such situations, the procedures can be observed by a potential intruder, and an intrusion or attack planned for a time when the entrance is vulnerable. Use of the security gate embodiment 1100 of the present invention can reduce or eliminate the need for boats to open and close such a net, because such opening and closing can be performed in response to commands received from a remote location, such as a from a dock, shore facility, vessel, aircraft, or other command source. The security gate 1100 can be fitted with different security features, such as the diver netting 610, razor wire 620, or sensors 640, such as those used on and described for the barrier embodiments.

The manner of mooring each system to the seabed, whether a harbor unit, ocean unit or the like, is site specific, but generally follows the same procedure. An anchor is driven into the seabed at the appropriate location. A means for mooring 290 which can be either a chain, a rope, or other means, which is suspended from the panels 100 is then attached to the anchor, generally by divers. The actual manner of connection of the mooring means 290 and the anchor will depend upon the particular combination being used, and will not be discussed further.

The anchor can be any form of dead weight that could be used for anchoring vessels or other items to the seabed. One example of an anchoring system employs MANTA RAY® anchors (registered trademark of Foresight Products, LLC, Commerce City, Colo.), which according to its manufacturer, are driven into the seabed using commonly available hydraulic or pneumatic apparatus. Once the anchor has been driven to its proper depth, a rod/tendon that is attached to the anchor is pulled to rotate the anchor into undisturbed soil, in a manner similar to the use of a toggle bolt. The anchor is then adjusted to the holding capacity required.

Another type of anchor employed, referred to as a screw anchor, is installed in the seabed by either divers or workboats, employing hydraulic installation equipment. This type of anchor includes a bearing plate which is installed through surface silt until a soil with good load bearing properties is reached. The mooring means 290 is then attached to the anchor. These anchors are similar to those used for holding fish cages secure to ocean bottoms in the aqua-culture field.

Another type of anchor, not shown, is a pyramid mooring anchor marketed under the trademark of DOR-MORO (registered trademark of Dor-Mor, Inc., Claremont N.H.). This anchor has a pyramidal bottom which penetrates the seabed, and can be used for mud, clay or sandy seabeds.

In another embodiment, a pile 260 can be used instead of the anchoring systems described in the preceding paragraphs. Generally, the pile 260 can be either a conventional steel or wooden pile, driven into bedrock or a good bearing surface. An embodiment of the present invention utilizes steel piles. Such piles 260 may be used in environments where the soil conditions are poor. Where piles 260 are used as the mooring means, the piles 260 are received within hub opening 234. Thus, for the harbor embodiment 400 shown in FIG. 1B, two piles 260 would be used for mooring. If screw anchors were being used as the mooring means for an ocean or inland waterway embodiment, generally 5 such anchors would be used, with the caveat that the number is also dependent upon soil conditions and load.

One embodiment of pile 260 comprises a pipe having an outer diameter of about 10.75 inches, with a wall thickness of about one-half inch. Such a pile 260 can be coated with a coating to protect it against the elements, such as a powder coating, a coal tar epoxy coating, a hot dipped galvanized coating, or other form of metallizing coating. The pile 260 has a tensile strength in excess of 50,000 psi.

For harbor applications, a marine grade, either galvanized or stainless steel chain 280 is used to connect the panels to the mooring means 290. In an embodiment, chain 280 is manufactured of 1 ¾ inch wire size chain, and is characterized by a break load of about 100,000 pounds.

Rope 280 can also be used to moor the systems of the present invention. The rope 280 can be a mooring rope manufactured from steel wire, polyester fibers, aramid, a synthetic polyethylene fiber rope, or other materials commonly used in the manufacture of hawsers, mooring lines, ship-assist lines and the like. In one embodiment, one inch thick polyethylene rope is employed, and is characterized by having a tensile strength in excess of 75,000 psi.

The panels can be manufactured in a variety of colors, and a variety of surface finishes.

As has been described, a variety of anchoring means can be utilized.

For systems installed in areas prone to sub-freezing temperatures where ice may form, an ice barrier cap (not shown) can be installed, and the system could be equipped with a system for de-icing (not shown).

One or more signs (not shown) could also be deployed, either directly on a system, or in either the water nearby, or on land, to serve as a warning that a barrier is in place, as a warning against anchoring in the vicinity, as a warning against entry, or the like. The choice of signage, its language and disposition on the system can be selected by the user.

To illustrate the performance of embodiments of the present invention, tests were performed utilizing scale models.

EXAMPLE 1

Effect of Ocean Unit on Wave Dissipation

An ocean unit 300, such as that shown in FIG. 1A, was positioned in a facility with a water depth of 11 feet. The unit deployed had a width of 36 feet, and a draft of 8 feet. Waves having a height of about 3 feet, and periods ranging from about 4 to over 9 seconds, and wave lengths ranging from about 80 to over 430 feet, were tested. As shown in Table 2, a wave height reduction of between 50% to 75% was achieved with this embodiment.

TABLE 2

Effects of wave length on wave dissipation.

| Height (Feet) | Period (Seconds) | Wave Length (Feet) | Transmission Coefficient (Kt) | Height Reduction |
|---|---|---|---|---|
| 2.99 | 3.9 | 77.9 | 0.25 | 75% |
| 3.13 | 5.2 | 138.4 | 0.328 | 67% |
| 2.89 | 6.5 | 216.3 | 0.412 | 59% |
| 2.8 | 7.9 | 319.5 | 0.503 | 50% |
| 2.98 | 9.2 | 433.4 | 0.476 | 52% |

EXAMPLE 2

Effect of Larger Unit on Wave Dissipation

In this example, an embodiment comprising 8 rows of panels, having a length of about 78 feet, and an 8 foot draft, was moored in water having a depth of 12.5 feet. The wave heights ranged from about 3 to about 4 feet, with a periodicity of between about 4 to over 9 seconds, and a wave length of between about 80 to over 433 feet. As shown in Table 3, a wave height reduction of between 74 to 82% was achieved with this embodiment.

TABLE 3

Effects of wave length on wave dissipation.

| Height (Feet) | Period (Seconds) | Wave Length (Feet) | Transmission Coefficient (Kt) | Height Reduction |
|---|---|---|---|---|
| 2.96 | 3.9 | 77.9 | 0.184 | 82% |
| 3.13 | 5.2 | 138.4 | 0.239 | 76% |
| 3.41 | 6.5 | 216.3 | 0.219 | 78% |
| 3.36 | 7.9 | 319.5 | 0.241 | 76% |
| 3.37 | 9.2 | 433.4 | 0.265 | 74% |

Another embodiment is similar in structure to system 1400 (FIG. 7), but the panels include an inflatable bladder and at least one fin, both of which serve to adjust the energy of the wave passing through the panel. Panels including the bladder can be submerged or raised with wave conditions, and the extent to which a particular panel is open or closed can be controlled by the action of the fin. In one embodiment, several fins are present on the panel, and are controlled by means of a hydraulic system and control mechanism. The control mechanism is in communication with a sensor mounted on the front of the structure, which sensor detects the wave conditions and communicates the wave conditions to the controller. The controller, which may be a mechanical device such as a solenoid control, or a central processing unit, a computer, or other electronic control device known to those skilled in the art, in turn actuates the appropriate bladder to inflate or deflate, or which panel, or group of panels, to adjust the fins on, either creating a more open or a more closed panel. The software employed by the computer will match the system configuration to conditions of the incoming waves in real time. As a result of such changes in the percentage opening (porosity) of a panel, or series of panels, the system causes a massive turbulence of the wave entering the system, leading to the dissipation of the wave energy. The bladder is operated in the form of a closed loop, under pressure from a reserve tank. In this system, each panel is capable of operating independently of each other, and should one or panels fail, or go "off-line", the other panels in the system can compensate for such a problem. It is anticipated that this embodiment can function as well as the previous embodiments described in this specification, and be able to utilize smaller sized units to accomplish the same effects. In addition, this embodiment also enables the user to grow a beach by encouraging the deposition of sand thereon. Alternatively, the system can be switched off, and the natural process of beach build-up be allowed to occur. Further, because it can be operated in response to changes in wave conditions, in the face of an upcoming storm, or if changes occur in the beach profile, the system can be actuated.

In summary, several different deployment options are possible for units to be deployed within a harbor. These units can be portable and are readily adaptable for any potential harbor expansion. Embodiments of the present invention can also be used as a dock or finger dock, thus blending into the existing configuration of a marina. Several different types of panel can be used to customize embodiments of the present invention to a marina. The sizes allow embodiments of the present invention to quickly and easily adapt to a deployment location. When different sized panels are deployed, the panels operate in a different manner, because the apertures are different on the smaller panels and are designed to create straight jets of water with increased velocity where larger sized panels send jets of energy at angles. By alternating flows of energy at different levels in the water column tremendous turbulence is created within a small area. Thus embodiments of the present invention provide significant performance advantages over conventional technologies with regards to the area covered and the mass of structure required to dissipate waves.

In addition, embodiments of the present invention can be used as a silt barrier to prevent build up of sediment in harbors. When deployed in sensitive environmental areas, embodiments of the present invention do not block light from reaching grasses, such as eel grass, because large pools of light are created within the structure. Embodiments of the present invention can also act as an underwater reef. The structure can be adjustable for any depth of water or slope because of the use of multiple size panels. By closing up all of the apertures, embodiments of the present invention can be used as a silt barrier, and some of the apertures can be plugged using a rubber plug, which results in a change in performance. Because certain embodiments are portable, they can be easily moved around with small workboats and dives. Embodiments of the present invention can be used in staggered deployment, for use in channels thus allowing for vessel access and passage. In addition, the panels can be coated with ARMORTHANE® (registered trademark of ArmorThane Coatings Inc., Edmonton, Alberta, Canada for their brand of polyurethane wear-resistant protective coatings for use on truck beds, tanks and metal, wood, fiberglass or concrete deck surfaces) or a comparable or equivalent type of polyurethane or other plastic coating, which provides additional strength and abrasion resistance when units are abutted against steel or concrete in the marine environment.

Embodiments deployed for use in harbors allow a dock to be built upon them. The mass and the buoyancy of the units is adjustable while in the water, and the physical makeup of structure can be adjusted in the water, and panels can be replaced to provide better performance or upgrades to system. The combination of multiple sized panels enables users to have structures which can match the contour of the seabed, and which could fit under piers or other tight spaces. The combination of multiple sized panels in a unit, which can operate in different ways, combine to dissipate the energy of a wave. The hydrostatic pressure created as a result of the movement of water through the apertures helps to remove debris from the apertures, and can prevent the accumulation of flotsam within the apertures of the panels. Modifications can be made to existing units to convert wave energy into usable electrical current.

Therefore, although this invention has been described with a certain degree of particularity, it is to be understood that the present disclosure is made by way of illustration, and that numerous changes in the details of construction and arrangements of parts may be resorted to without departing from the spirit and scope of the invention.

I claim:

1. A system comprising:
a first row comprising a plurality of modules connected with each other, each of the plurality of modules comprising:
a front surface including a first portion and a second portion;
a rear surface oppositely located with respect to the front surface;
a plurality of passageways formed in the first portion of the front surface, each of the passageways having an inlet in the front surface to receive a wave and an outlet in the rear surface to discharge the wave from the module, each of the passageways being tapered inwardly in the direction from the inlet to the outlets, such that the wave passing through the passageways is substantially dissipated after being discharged from the outlets;
concentric grooves formed in the second portion of the front surface; and
shackles disposed at both end modules of the first row; and mooring means for engaging the shackles for connecting the system to anchoring means.

2. The system of claim 1, further comprising a second row comprising a plurality of the modules connected with each other, and the second row being stacked on the first row so as to make a larger area for receiving a wave.

3. The system of claim 1, wherein the system further comprises razor wire provided thereon.

4. A method comprising:
placing in a location facing an oncoming wave, a system comprising:
a first row comprising a plurality of modules connected with each other, each of the plurality of modules comprising:
a front surface including a first portion and a second portion;
a rear surface oppositely located with respect to the front surface;
a plurality of passageways formed in the first portion of the front surface, each of the passageways having an inlet in the front surface to receive a wave and an outlet in the rear surface to discharge the wave from the module, each of the passageways being tapered inwardly in the direction from the inlet to the outlets, such that the wave passing through the passageways is substantially dissipated after being discharged from the outlets;
concentric grooves formed in the second portion of the front surface; and
shackles disposed at both end modules of the first row; and mooring means for engaging the shackles for connecting the system to anchoring means.

5. The method of claim 4, wherein the system further comprises a second row comprising a plurality of the modules connected with each other, and the second row being stacked on the first row so as to make a larger area for receiving a wave.

6. The method of claim 4, wherein the system further comprises razor wire provided thereon.

7. A system comprising:
a plurality of subsystems including a first subsystem and a second subsystem, each of the first and second subsystems comprising:
a first row comprising a plurality of modules connected with each other, each of the plurality of modules comprising:
a front surface including a first portion and a second portion;
a rear surface oppositely located with respect to the front surface;
a plurality of passageways formed in the first portion of the front surface, each of the passageways having an inlet in the front surface to receive a wave and an outlet in the rear surface to discharge the wave from the module, each of the passageways being tapered inwardly in the direction from the inlet to the outlets, such that the wave passing through the passageways is substantially dissipated after being discharged from the outlets;

concentric grooves formed in the second portion of the front surface; and lugs disposed at both end modules of the first row for receiving a guide;

a guide passing through the lugs for slidably engaging the lugs, wherein a height of at least one of the first and second subsystems is adjustable by the guide, wherein the first subsystem and the second subsystem are movably connected by the lugs and the guide.

8. The system of claim 7, wherein the guide is provided with an anchor for anchoring the system to the seabed.

9. The system of claim 7, wherein the guide passes through at least one lug of the first subsystem and at least one lug of the second subsystem.

10. The system of claim 7, wherein at least one of the first and second subsystems further comprises a second row comprising a plurality of the modules connected with each other, and the second row being stacked on the first row of said at least one of the first and second subsystems so as to make a larger area for receiving a wave.

11. The system of claim 10, wherein an arrangement of the modules in the first subsystem is different from an arrangement of the modules in the second subsystem.

12. The system of claim 7, wherein at least one of the first and second subsystems further comprises razor wire provided thereon.

* * * * *